United States Patent
Onggosanusi et al.

(10) Patent No.: US 11,716,230 B2
(45) Date of Patent: Aug. 1, 2023

(54) METHOD AND APPARATUS FOR MULTISTREAM TRANSMISSION

(71) Applicant: Samsung Electronics Co., Ltd., Suwon-si (KR)

(72) Inventors: Eko Onggosanusi, Coppell, TX (US); Md Saifur Rahman, Plano, TX (US); Younsun Kim, Seongnam-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/947,970

(22) Filed: Aug. 26, 2020

(65) Prior Publication Data
US 2020/0389345 A1    Dec. 10, 2020

Related U.S. Application Data

(63) Continuation of application No. 15/821,882, filed on Nov. 24, 2017, now abandoned.
(Continued)

(51) Int. Cl.
*H04L 27/26* (2006.01)
*H04L 1/00* (2006.01)
(Continued)

(52) U.S. Cl.
CPC ........ *H04L 27/2601* (2013.01); *H04L 1/0026* (2013.01); *H04L 1/0061* (2013.01);
(Continued)

(58) Field of Classification Search
CPC . H04L 27/2601; H04L 1/0026; H04L 1/0061; H04L 67/325; H04L 69/324;
(Continued)

(56) References Cited

U.S. PATENT DOCUMENTS

2010/0239040 A1    9/2010   Beluri et al.
2010/0296603 A1   11/2010   Lee et al.
(Continued)

FOREIGN PATENT DOCUMENTS

CN    102356564 A      2/2012
KR    10-1641968 B1    7/2016
(Continued)

OTHER PUBLICATIONS

Communication pursuant to Article 94(3) EPC dated Feb. 1, 2021 in connection with European Patent Application No. 17 875 732.4, 5 pages.
(Continued)

*Primary Examiner* — Sudesh M Patidar

(57) ABSTRACT

Multistream transmissions are provided for user equipment (UE) including a transceiver configured to receive an L-layer data transmission that includes at least one codeblock (CB). The CB includes a length-N cyclic redundancy code (CRC). The transceiver is also configured to receive a downlink control information (DCI) associated with the data transmission. The UE further includes a processor operably connected to the transceiver. The processor is configured to decode the data transmission, the CRC, and the DCI. The data transmission includes one codeword (CW) when L is less than or equal to a threshold and two CWs when L is greater than the threshold.

21 Claims, 12 Drawing Sheets

Related U.S. Application Data

(60) Provisional application No. 62/527,370, filed on Jun. 30, 2017, provisional application No. 62/520,129, filed on Jun. 15, 2017, provisional application No. 62/501,195, filed on May 4, 2017, provisional application No. 62/477,063, filed on Mar. 27, 2017, provisional application No. 62/464,762, filed on Feb. 28, 2017, provisional application No. 62/449,858, filed on Jan. 24, 2017, provisional application No. 62/446,927, filed on Jan. 17, 2017, provisional application No. 62/441,140, filed on Dec. 30, 2016, provisional application No. 62/428,786, filed on Dec. 1, 2016.

(51) Int. Cl.
*H04L 67/62* (2022.01)
*H04L 69/324* (2022.01)
*H04B 17/24* (2015.01)
*H04L 1/06* (2006.01)
*H04L 5/00* (2006.01)
*H04B 17/309* (2015.01)
*H04B 7/06* (2006.01)

(52) U.S. Cl.
CPC ............ *H04L 67/62* (2022.05); *H04L 69/324* (2013.01); *H04B 7/06* (2013.01); *H04B 17/24* (2015.01); *H04B 17/309* (2015.01); *H04L 1/0656* (2013.01); *H04L 5/0023* (2013.01)

(58) Field of Classification Search
CPC ... H04L 1/0656; H04L 5/0023; H04L 1/0025; H04L 1/0003; H04L 1/0057; H04L 1/0067; H04L 5/0007; H04B 7/06; H04B 17/24; H04B 17/309; H04W 72/042
See application file for complete search history.

(56) References Cited

U.S. PATENT DOCUMENTS

| | | | |
|---|---|---|---|
| 2010/0303016 A1 | 12/2010 | Jin et al. | |
| 2010/0303034 A1* | 12/2010 | Chen | H04L 25/03343 370/329 |
| 2011/0211488 A1 | 9/2011 | Kwon et al. | |
| 2012/0033630 A1* | 2/2012 | Chung | H04W 72/0453 370/329 |
| 2013/0021898 A1* | 1/2013 | Kang | H04B 7/0417 370/216 |
| 2013/0039348 A1* | 2/2013 | Hu | H04B 7/0613 370/335 |
| 2014/0079018 A1 | 3/2014 | Seo et al. | |
| 2015/0021991 A1* | 1/2015 | Wood | H02J 3/38 307/23 |
| 2016/0021651 A1* | 1/2016 | Ko | H04B 7/04 370/329 |
| 2016/0037524 A1* | 2/2016 | Krzymien | H04L 1/1812 370/329 |
| 2016/0254849 A1* | 9/2016 | Moulsley | H04L 5/0023 370/329 |
| 2016/0365993 A1* | 12/2016 | Chen | H04L 25/03904 |
| 2017/0026956 A1* | 1/2017 | Yin | H04L 1/0031 |
| 2017/0188371 A1* | 6/2017 | Kim | H04L 5/005 |
| 2017/0290046 A1* | 10/2017 | Sun | H04J 11/0036 |
| 2018/0048372 A1* | 2/2018 | Sun | H04B 7/0686 |
| 2018/0049047 A1* | 2/2018 | Lin | H04W 24/02 |
| 2018/0102877 A1* | 4/2018 | Jiang | H04W 28/18 |
| 2018/0124794 A1* | 5/2018 | Nogami | H04B 7/0452 |
| 2018/0310324 A1* | 10/2018 | Ibars Casas | H04L 1/1893 |
| 2019/0037428 A1* | 1/2019 | Åström | H04B 17/309 |

FOREIGN PATENT DOCUMENTS

| | | |
|---|---|---|
| KR | 20160105832 A | 9/2016 |
| WO | 2012157968 A2 | 11/2012 |

OTHER PUBLICATIONS

IP Australia, Examination Report No. 2 regarding Application No. 2017367666, dated Mar. 3, 2022, 3 pages.

Korean Intellectual Property Office, Notice Of Preliminary Rejection regarding Application No. 10-2019-7018868, dated May 8, 2022, 15 pages.

China National Intellectual Property Administration, Second Office Action regarding Application No. 201780074585.3, dated May 7, 2022, 11 pages.

IP Australia, "Examination report No. 1 for standard patent application" dated Nov. 25, 2021, in connection with Australian Patent Application No. 2017367666, 3 pages.

Korean Intellectual Property Office, "Notice of Preliminary Rejection" dated Nov. 26, 2021, in connection with Korean Patent Application No. 10-2019-7018868, 13 pages.

Intellectual Property India, "Examination report under sections 12 & 13 of the Patents Act" dated Dec. 17, 2021, in connection with Indian Patent Application No. 201937024467, 5 pages.

IP Australia, Examination Report No. 1 dated May 29, 2023 regarding Application No. 2022231791, 3 pages.

\* cited by examiner

METHOD AND APPARATUS FOR MULTISTREAM TRANSMISSION

CROSS-REFERENCE TO RELATED APPLICATIONS AND CLAIM OF PRIORITY

This application is a continuation of U.S. Non-Provisional patent application Ser. No. 15/821,882 filed Nov. 24, 2017, and claims priority to U.S. Provisional Patent Application No. 62/428,786 filed Dec. 1, 2016, U.S. Provisional Patent Application No. 62/441,140 filed Dec. 30, 2016, U.S. Provisional Patent Application No. 62/446,927 filed Jan. 17, 2017, U.S. Provisional Patent Application No. 62/449,858 filed Jan. 24, 2017, U.S. Provisional Patent Application No. 62/464,762 filed Feb. 28, 2017, U.S. Provisional Patent Application No. 62/477,063 filed Mar. 27, 2017, U.S. Provisional Patent Application No. 62/501,195 filed May 4, 2017, U.S. Provisional Patent Application No. 62/520,129 filed Jun. 15, 2017, and U.S. Provisional Patent Application No. 62/527,370 filed Jun. 30, 2017. The content of the above-identified patent documents is hereby incorporated by reference.

TECHNICAL FIELD

The present disclosure relates generally to methods for enabling multi-stream transmission. Such methods can be used when a user equipment is equipped with a plurality of transmit antennas and transmit-receive units.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for multi-stream transmission.

In one embodiment, a user equipment (UE) is provided. The UE includes a transceiver configured to receive an L-layer data transmission that includes at least one codeblock (CB). The CB includes a length-N cyclic redundancy code (CRC). The transceiver is also configured to receive a downlink control information (DCI) associated with the data transmission. The UE further includes a processor operably connected to the transceiver. The processor is configured to decode the data transmission, the CRC, and the DCI. The data transmission includes one codeword (CW) when L is less than or equal to a threshold and two CWs when L is greater than the threshold.

In another embodiment, a base station (BS) is provided. The BS includes a processor configured to generate an L-layer data transmission for a UE and to generate a DCI associated with the data transmission. The data transmission includes at least one CB and the CB includes a length-N CRC. The BS also includes a transceiver operably connected to the processor. The transceiver is configured to transmit the data transmission and the DCI. The data transmission includes one CW when L is less than or equal to a threshold and two CWs when L is greater than the threshold.

In another embodiment, a method for operating a UE is provided. The method includes receiving an L-layer data transmission. The data transmission includes at least one CB and the CB includes a length-N CRC. The method further includes receiving a downlink control information (DCI) associated with the data transmission and decoding the data transmission, the CRC, and the DCI. The data transmission includes one CW when L is less than or equal to a threshold and two CWs when L is greater than the threshold The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
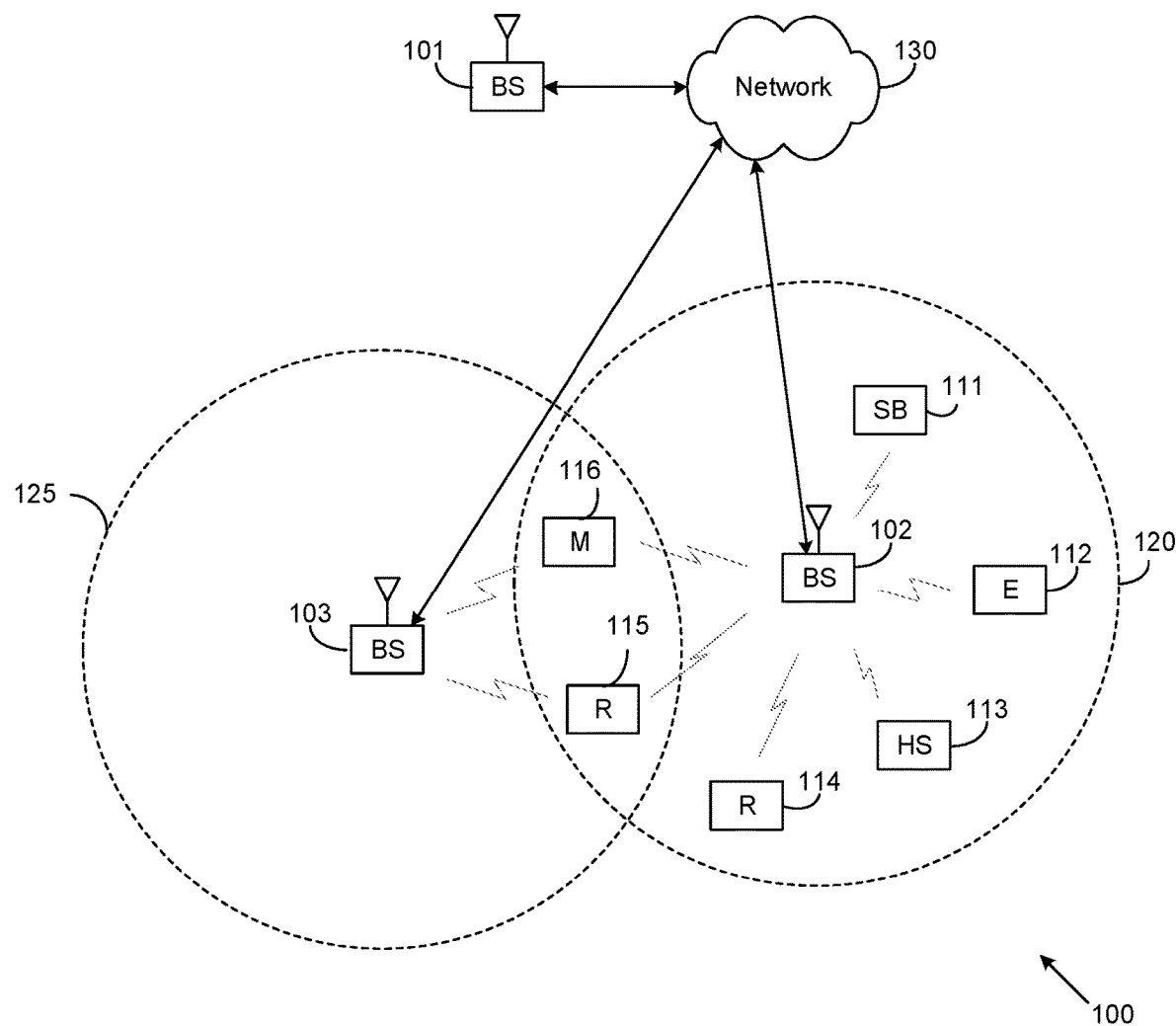
FIG. 1 illustrates an example wireless network according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms
2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); and 3GPP TS 36.331 version 12.4.0, "E-UTRA, Radio Resource Control (RRC) Protocol Specification" ("REF 5").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an alternative term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for multistream transmissions as described in embodiments of the present disclosure. In various embodiments, one or more of UEs 111-116 receive one or two codewords depending on the number of transmitted layers.

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
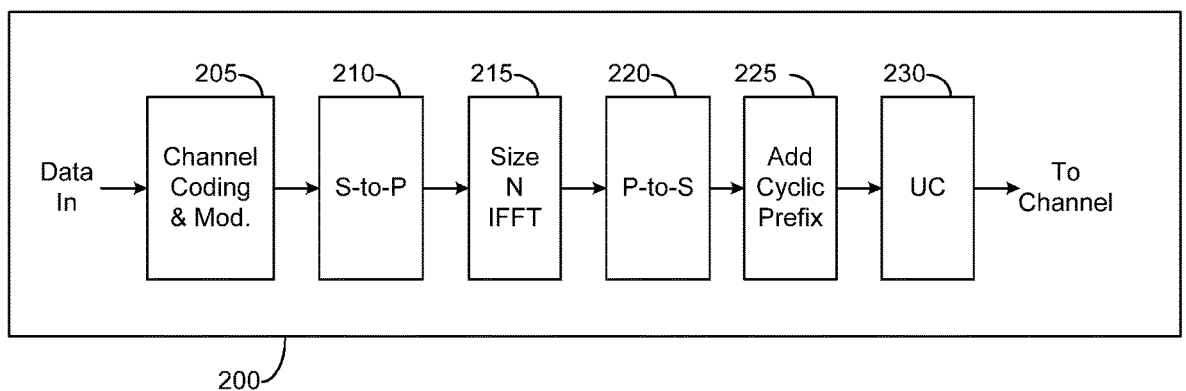
FIGS. 2A and 2B illustrate example wireless transmit and receive paths according to various embodiments of the present disclosure.
Figure 2B:
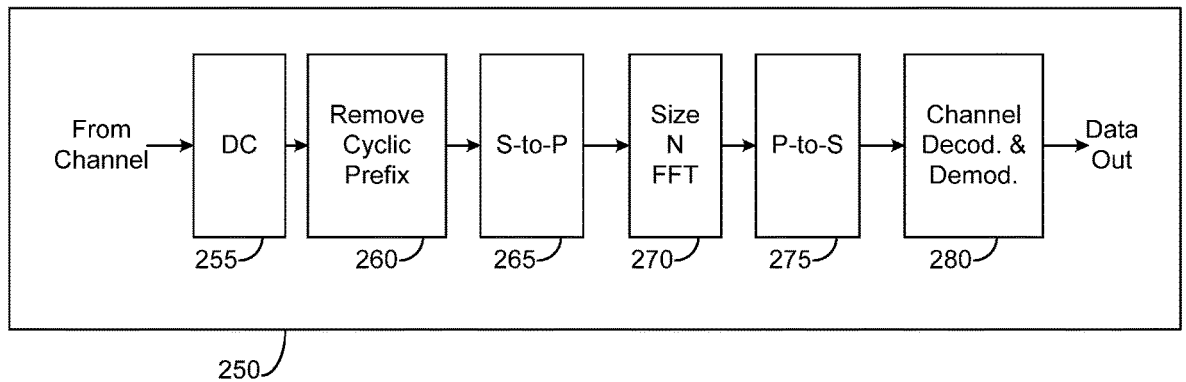

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive one or two codewords depending on the number of transmitted layers as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for multistream transmissions. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
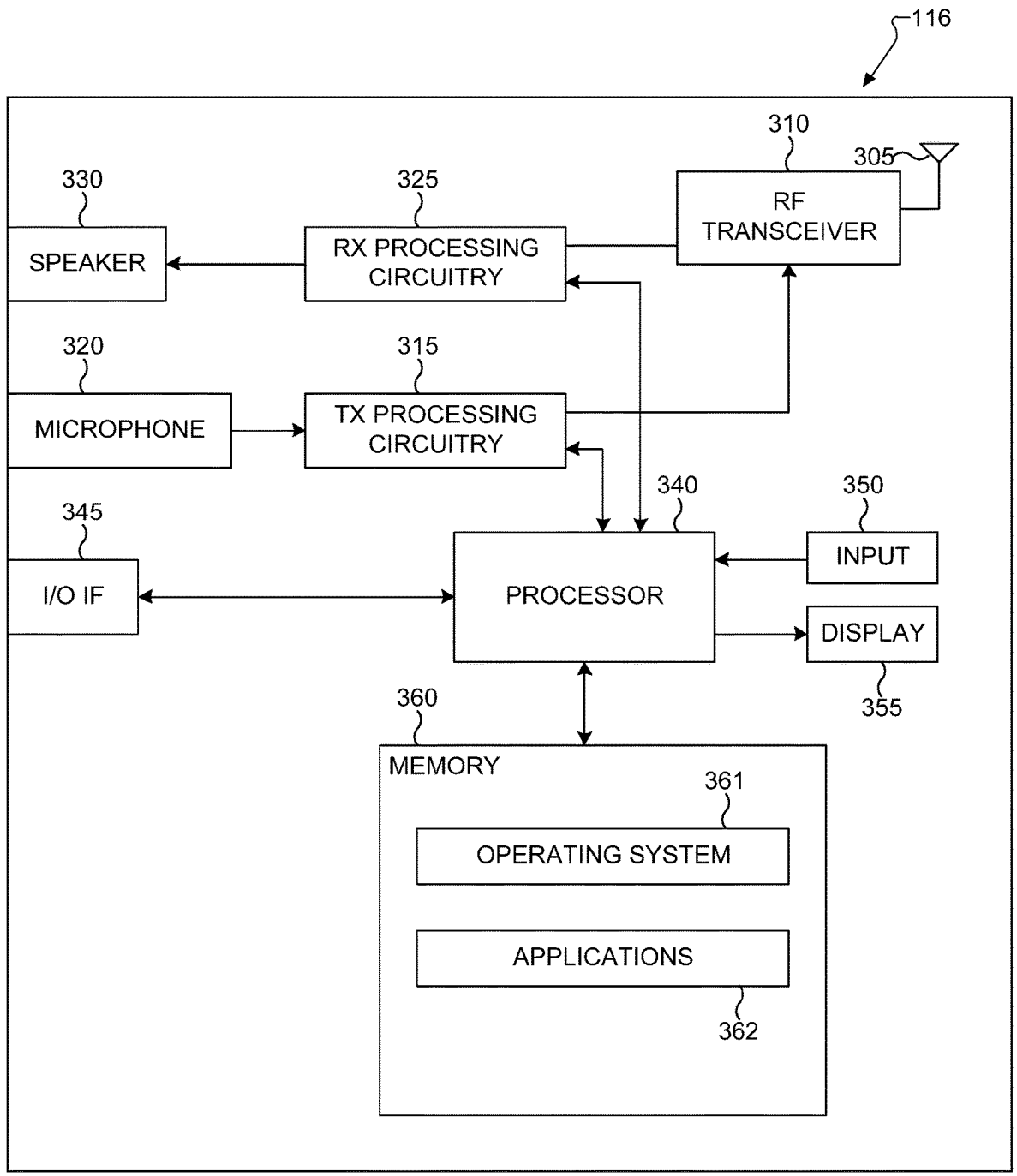
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CQI measurement and reporting for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for multistream transmissions. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
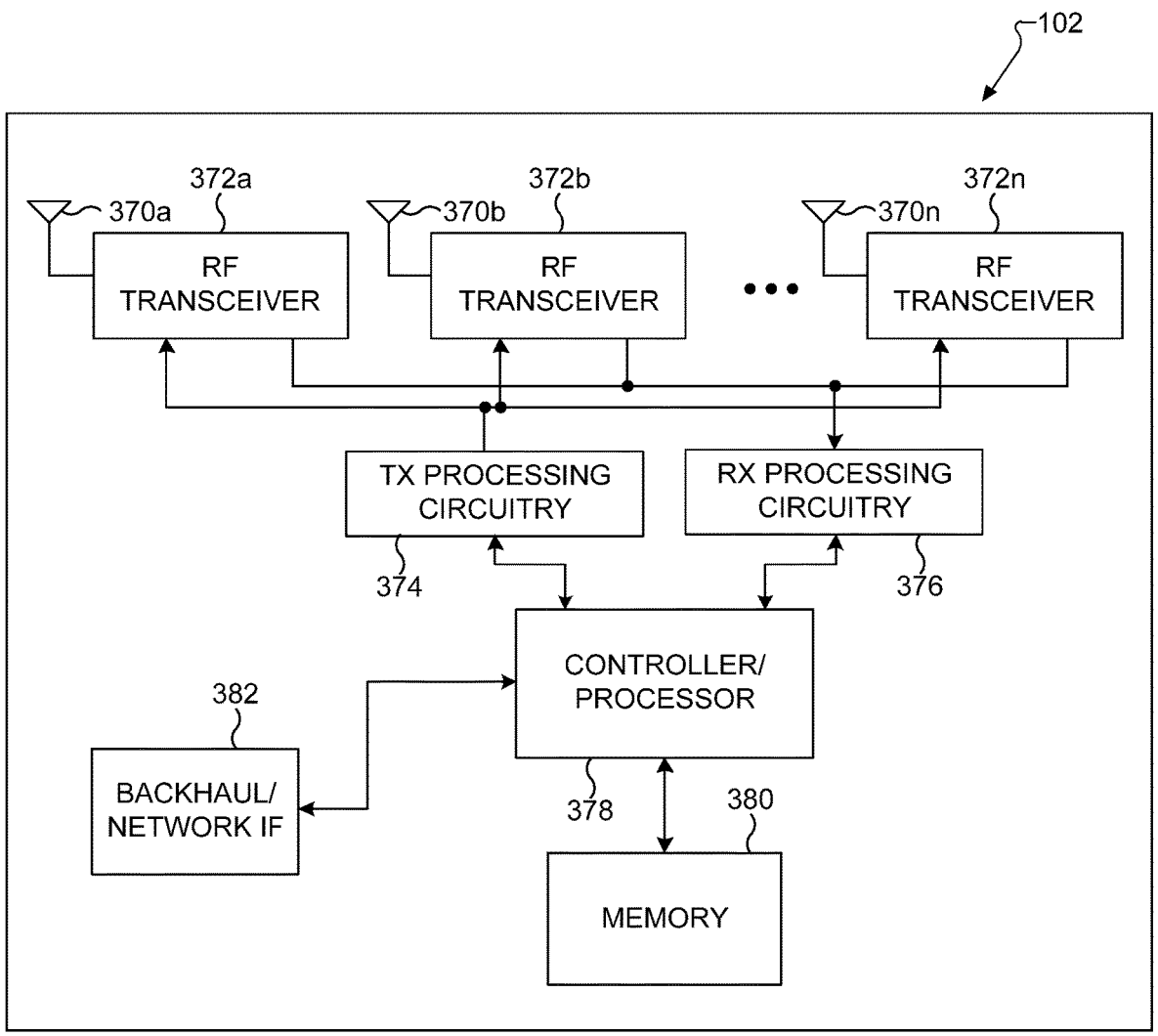
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) receive one or two codewords depending on the number of transmitted layers.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
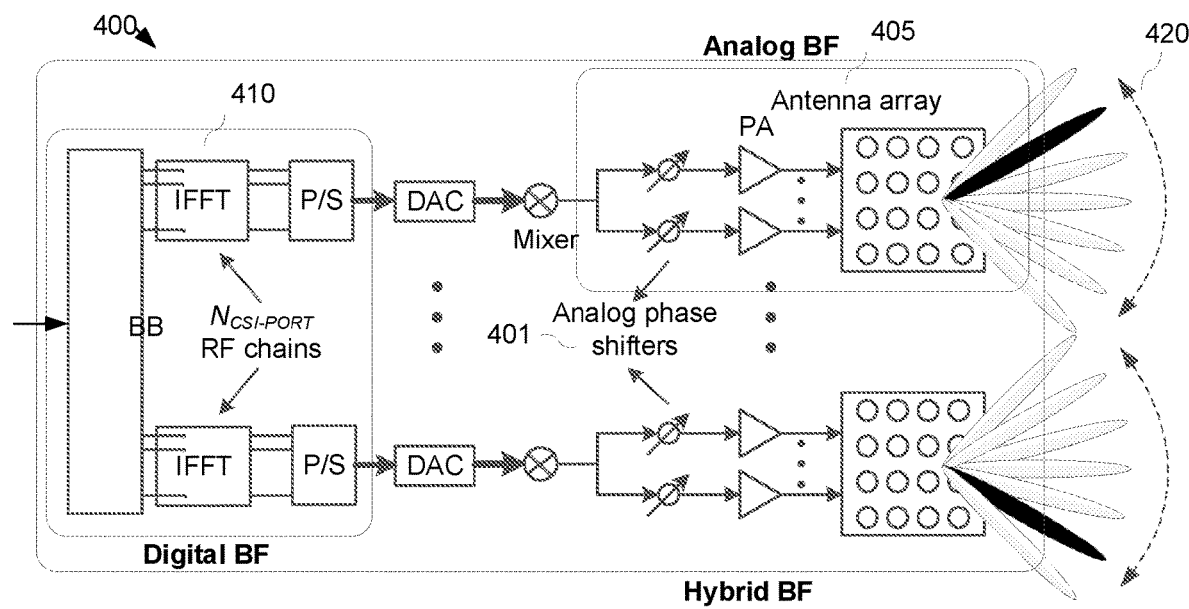
FIG. 4 illustrates an example beamforming architecture wherein one CSI-RS port is mapped onto a large number of analog-controlled antenna elements.

For mmWave bands, although the number of antenna elements can be larger for a given form factor, the number of CSI-RS ports which can correspond to the number of digitally precoded ports tends to be limited due to hardware constraints (such as the feasibility to install a large number of ADCs/DACs at mmWave frequencies) as illustrated in embodiment 400 of FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols). The number of sub-arrays (equal to the number of RF chains) is the same as the number of CSI-RS ports $N_{CSI\text{-}PORT}$. A digital beamforming unit 410 performs a linear combination across $N_{CSI\text{-}PORT}$ analog beams to further increase precoding gain. While analog beams are wideband (hence not frequency-selective), digital precoding can be varied across frequency sub-bands or resource blocks.

Figure 5:
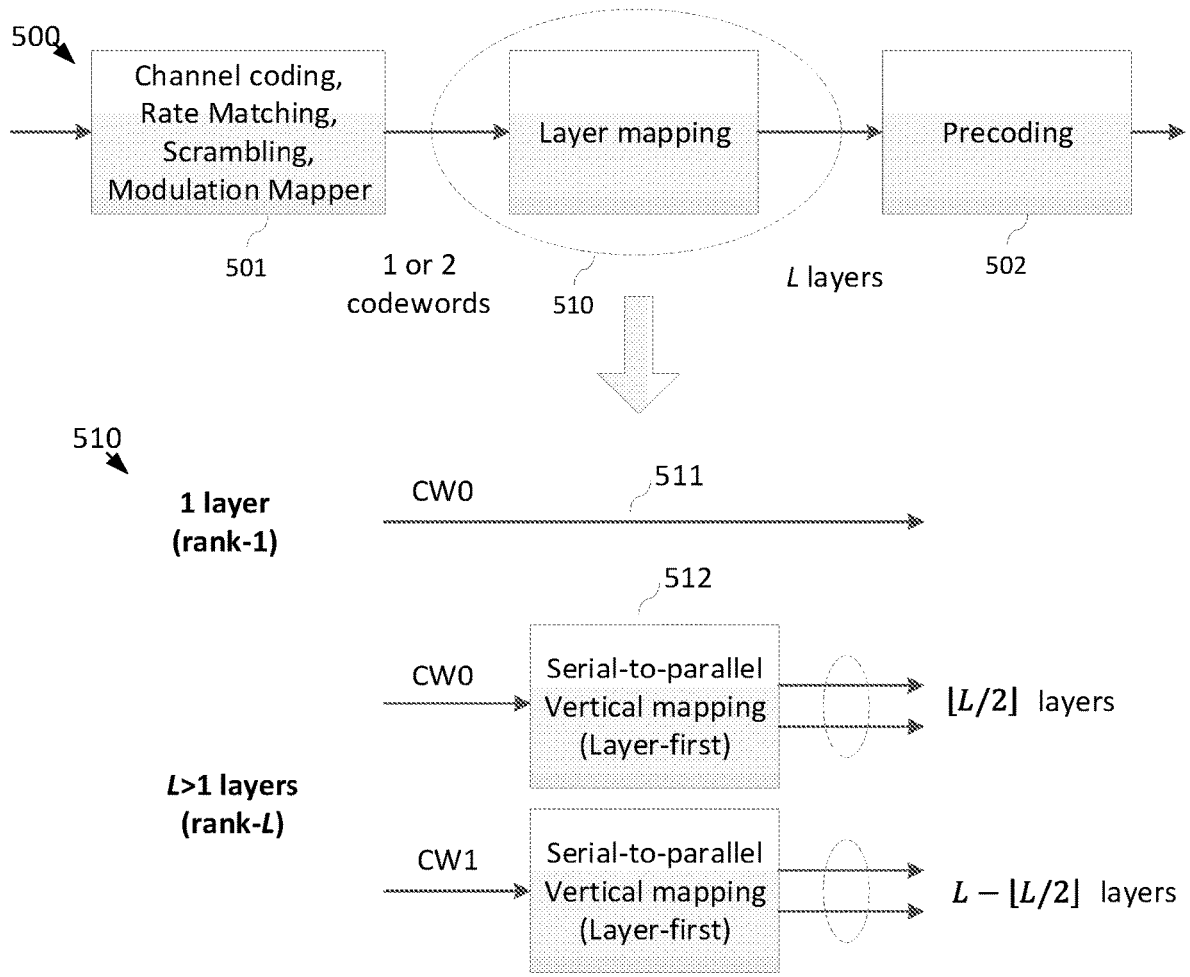
FIG. 5 illustrates an example embodiment for data transmission with spatial multiplexing according to an embodiment of the present disclosure.

In LTE, depending on the number of transmission layers, a maximum of two codewords are used for DL and UL data transmissions (on DL data channel such as PDSCH or PDCH, and UL data channel such as PUSCH or PUCH, respectively) for spatial multiplexing as illustrated in process 500 in of FIG. 5 (cf. TABLE 5.3.2A-1-2 and 6.3.3.2-1 of REF1 for UL and DL, respectively). Taking the output of the modulation mapper 501 (which maps the bit stream(s) generated by channel coding, rate matching, and scrambling), layer mapping 510 maps 1 or 2 codeword(s) to L layers before precoding 502. For L=1, one codeword is mapped to one layer (511). For L>1, each of the two codewords is mapped to at least one layer (512) where L layers are divided almost evenly across the two codewords. In addition, one codeword can also be mapped to >1 layers especially when only one of the two codewords is to be retransmitted.

Although beneficial for facilitating modulation-and-coding-scheme (MCS) adaptation per codeword (CW) and MMSE-SIC (MMSE with successive interference cancellation) receiver, it costs some significant overhead over a single CW mapping. DL overhead comes from the additional DCI payload due to 2 fixed MCS fields and 2 fixed NDI-RV (DL HARQ related) fields. UL overhead comes from the need for two CQIs (full 4-bit+delta 3-bit for wideband CQI, and 2× overhead for subband CQI) for rank>1 and two DL HARQ-ACKs for rank>1. Added to that is the complexity of having to accommodate more than one layer mapping schemes in case of retransmission.

Furthermore, when distributed MIMO such as non-coherent joint transmission (NC-JT) is incorporated into design requirements for 5G NR, the number of codewords (CWs) used for DL and UL transmissions per UE can increase with the number of TRPs.

Therefore, considering the above new challenges for 5G NR systems, there is a need for an improved codeword-to-layer mapping (or in short hand, 'layer mapping') with a single CW per UE for both DL and UL along with its signaling supports.

In the event that 2-CW transmission (per PDSCH/PUSCH assignment per UE) is used for higher rank transmission, it is desirable to introduce an additional component in CW-to-layer mapping which facilitates the control signaling overhead of 1-CW transmission: 1 MCS and 1 HARQ-related DCI fields, 1 CQI for the L layers. This scenario is relevant when, for example, 1 CW is mapped across L layers when $1 \le L \le 4$, and 2 CWs are mapped across L layers when $5 \le L \le 8$. In this example, the additional CW-to-layer mapping component is introduced when $5 \le L \le 8$. Or, in a second example, when 1 CW is mapped across L layers when $1 \le L \le 2$, and 2 CWs are mapped across L layers when $3 \le L \le 8$. In this example, the additional CW-to-layer mapping component is introduced when $3 \le L \le 8$.

Therefore, there is also a need for introducing an additional component in CW-to-layer mapping which facilitates the control signaling overhead of 1-CW transmission.

The present disclosure includes the following components for enabling reception of one or two codewords depending on the number of transmitted layers. A first component includes transmission schemes (which include multi-TRP support, code block segmentation, and layer mapping). A second component pertains to the signaling support.

Each of these components (including the components described later) can be used either by itself (without the other component) or in conjunction with at least one of the other component. Likewise, each of these components includes a plurality of sub-components. Each of the sub-components can be used either by itself (without any other sub-component) or in conjunction with at least one of the other sub-components.

The first component (that is, transmission schemes) includes features for supporting multi-TRP (transmit-receive points) transmission/reception. For DL, the number of TRPs involved in DL transmission on DL data channel (such as PDSCH or PDCH) may not be indicated (hence is transparent) to the UE. Therefore, the increase in the number of CWs received by the UE for multi-TRP scenario (e.g. when non-coherent JT is used) can be supported via a configurable number of CWs received by a UE.

In a first embodiment, the number of CWs received by a UE can be configured. This can be signaled either via higher-layer (RRC) signaling, MAC control element (CE), or L1 DL control signaling (carried by a single DL-related DCI). Regardless of how the configuration is signaled, a multi-TRP transmission (even with non-coherent JT) is assigned using a single DCI. This first embodiment, however, necessitates the UE to support reception with different number of CWs for a given number of layers.

Alternatively, the number of received CWs can be defined or specified to be less coupled from multi-TRP setup. In a second embodiment, a single CW is mapped to one or multiple layers (regardless of the number of layers) per DL data channel (such as PDSCH or PDCH) reception/assignment per UE. Therefore, a M-TRP transmission (e.g. with non-coherent JT) is assigned using M separate DCIs. In addition, a UE capability can be defined in terms of the number of DL data channel (such as PDSCH or PDCH) receptions/assignments per slot or subframe.

For UL, a single CW is mapped to one or multiple layers (regardless of the number of layers) per UL data channel grant (such as PUSCH or PUCH) reception/assignment per UE. In addition, a UE capability can be defined in terms of the number of UL data channel grants (such as PUSCH or PUCH) receptions/assignments per slot or subframe.

The first component (that is, transmission schemes) also includes code block (CB) segmentation. A CW originates from a transport block (TB). A TB, depending on its size, can be segmented into one or multiple code blocks (CBs) for the purpose of limiting channel decoding latency at the UE. For instance, in LTE one CB can be decoded and facilitate early detection of TB decoding failure.

Figure 6:
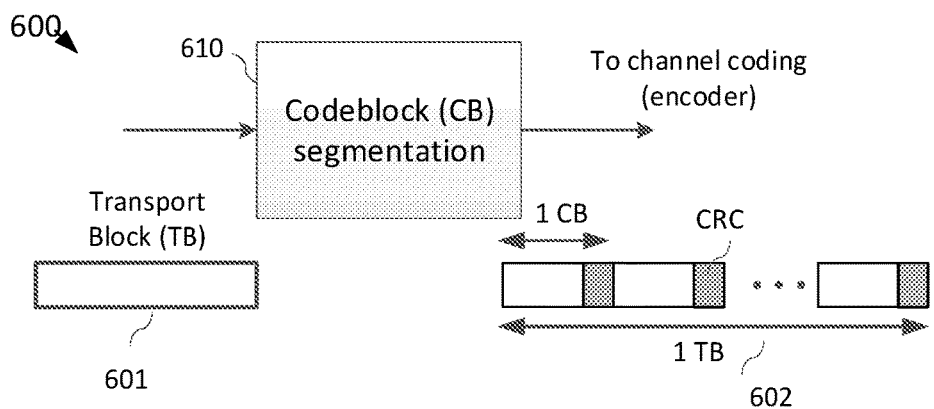
FIG. 6 illustrates an example embodiment for CB segmentation according to an embodiment of the present disclosure.

FIG. 6 illustrates the process 600 of CB segmentation wherein a TB 601 is partitioned into multiple CBs (with the special case of one CB when the TB size is small) 602. Given the number of layers L, the selected MCS, resource allocation, and possibly some other transmission parameters, CB segmentation 610 can include at least one of the following functions: segmentation of TB into one or more CBs, padding (to ensure a certain CB size before channel coding), introduction of CRC bits per CB (termed CB CRC). In addition, TB CRC bits can be added to 602 at the end (just as in LTE). However, to reduce overhead and functional redundancy, TB CRC is not required and hence not added.

In an alternative embodiment, CB CRC is not introduced (that is, CRC bits are not added to the CB). In this alternative embodiment, CB segmentation can include at least one of the following functions: padding (to ensure a certain CB size before channel coding) but without introducing CRC bits per CB (termed CB CRC). This can be done, for example, when LDPC (low-density parity check) coding is used since error detection functionality is inherent in LDPC (hence CRC is not needed). Therefore, TB CRC is not needed either.

A CW is formed after the output of CB segmentation is processed by channel coding (including rate matching).

To support single-CW transmission, an embodiment for CB segmentation is given below. In one embodiment, CB segmentation can be defined such that for L-layer transmission (DL or UL), a TB (hence a CW) comprises an integer multiple of L code blocks (CBs). In addition, the following additional rule can be added: when the number of CBs in the received (DL) or transmitted (UL) TB/CW is less than the maximum number of layers supported by the UE, the number of layers assigned to the UE is set to be equal to the number of CBs in the received (DL) or transmitted (UL) TB/CW.

The first component (that is, transmission schemes) also includes CW-to-layer mapping (or simply referred to as layer mapping). The support for a single CW UL transmission and DL reception per UE can be done via one of the following embodiments on layer mapping.

In the following embodiments and sub-embodiments, either of the following two different RE mapping schemes applies: frequency-first and time-first.

The stream of modulated symbols {d(i)} (indexed by i) is formed by serially concatenating the modulated symbols from the CBs associated with the single CW/TB. This symbol stream {d(i)} serves as an input to layer mapping.

For frequency-first mapping, a stream of modulated symbols is first mapped across frequency sub-carriers (REs) within a set of allocated PRBs, then across OFDM symbols within a scheduling time unit (slot or subframe). To illustrate, given a stream of modulated symbols {d(i)} mapped to a set of REs indexed {(k, l)} (where k and l denote frequency/sub-carrier and time/OFDM symbol indices, respectively), as index i is increased, frequency-first mapping maps d(i) by first increasing index k from 0 to $k_{MAX}-1$ (for a fixed l), then increasing index l. That is, k=mod(i, $k_{MAX}$) and l=$\lfloor i/k_{MAX} \rfloor$ where $k_{MAX}$ is the number of frequency sub-carriers (REs) in the allocated PRBs.

For time-first mapping, a stream of modulated symbols is first mapped across OFDM symbols within a scheduling time unit (slot or subframe), then across frequency sub-carriers (REs) within a set of allocated PRBs. To illustrate, given a stream of modulated symbols {d(i)} mapped to a set of REs indexed {(k, l)} (where k and l denote frequency/sub-carrier and time/OFDM symbol indices, respectively), as index i is increased, time-first mapping maps d(i) by first increasing index l from 0 to $l_{MAX}-1$ (for a fixed k), then increasing index k. That is, k=$\lfloor i/l_{MAX} \rfloor$ and l=mod(i, $l_{MAX}$) where $l_{MAX}$ is the number of OFDM symbols in a scheduling time unit (slot or subframe).

Frequency-first mapping is used for illustrative purposes in the following embodiments and sub-embodiments for a given (spatial) layer. Extensions to time-first mapping are straightforward to those familiar with the art.

Figure 7A:
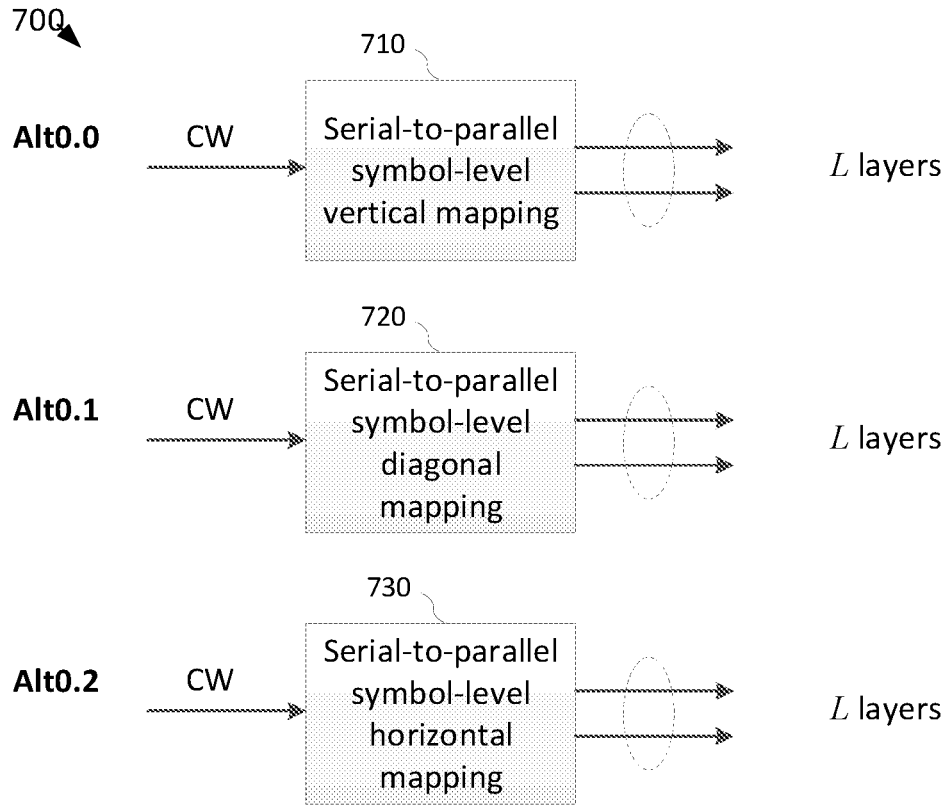
FIG. 7A illustrates an example embodiment for symbol-level layer mapping according to an embodiment of the present disclosure.
Figure 7B:
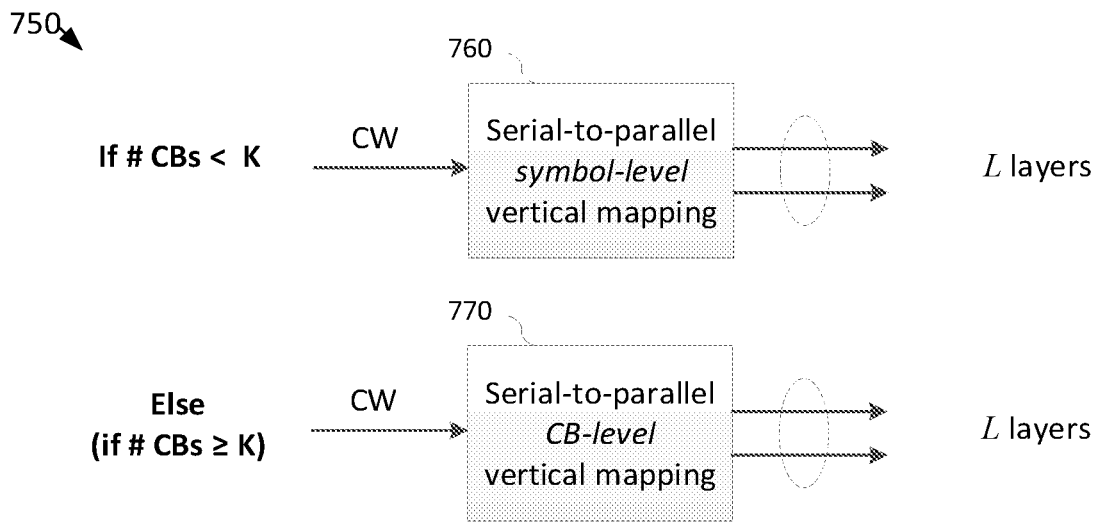
FIG. 7B illustrates an example embodiment for CB-length-dependent layer mapping according to an embodiment of the present disclosure.

In one embodiment, one CW is mapped onto L layers in per-symbol basis. Here, a symbol signifies a QPSK or M-QAM modulated symbol resulting from mapping a group of coded bits to QPSK or M-QAM constellation (i.e. the output of modulation mapper). This embodiment is illustrated in FIG. 7A. At least three mapping schemes 700 can be used: vertical (710), diagonal (720), and horizontal (730). The symbol-level mapping scheme performs a mapping from a stream of modulated symbols (from one CW) to L layers across the allocated frequency and time resources.

The stream of modulated symbols {d(i)} (indexed by i) is formed by serially concatenating the modulated symbols from the CBs associated with the single CW/TB. This symbol stream {d(i)} serves as an input to layer mapping.

For vertical mapping, the stream of symbols is mapped first across L layers, then across frequency sub-carriers (REs) within a set of allocated PRBs, then across OFDM symbols within a scheduling time unit (slot or subframe). Denoting $M_{symb}^{layer}$, $M_{symb}^{CW}$, $x^{(l)}(i)$, and d(i) as the number of symbols per layer, the number of symbols in one CW, symbol stream for layer l, and symbol stream for the CW, respectively, the CW-to-layer mapping can be described as follows. Here, CB segmentation and/or rate matching ensure that $M_{symb}^{CW}$ is divisible by L.

$$x^{(l)}(i) = d(Li + l), i = 0, 1, \ldots, M_{symb}^{layer} - 1, \quad \text{(Equation 1)}$$
$$l = 0, 1, \ldots, L - 1$$
$$M_{symb}^{layer} = M_{symb}^{CW}/L$$

For horizontal mapping, the stream of symbols is mapped first across frequency sub-carriers (REs) within a set of allocated PRBs, then across OFDM symbols within a scheduling time unit (slot or subframe), then across L layers. Using the same notation, the CW-to-layer mapping can be described as follows. Here, CB segmentation and/or rate matching ensure that $M_{symb}^{CW}$ is divisible by L.

$$x^{(l)}(i) = d(i + M_{symb}^{layer} l), i = 0, 1, \ldots, M_{symb}^{layer} - 1, \quad \text{(Equation 2)}$$
$$l = 0, 1, \ldots, L - 1$$
$$M_{symb}^{layer} = M_{symb}^{CW}/L$$

For diagonal mapping, the stream of symbols can be mapped first jointly across layers and frequency sub-carriers (REs) within a set of allocated PRBs, then across OFDM symbols within a scheduling time unit (slot or subframe). Alternatively, the stream of symbols can be mapped jointly across layers, frequency sub-carriers (REs) within a set of allocated PRBs, and OFDM symbols within a scheduling time unit (slot or subframe). For example, using the same notation, the CW-to-layer mapping can be described as follows (for the second alternative). Here, CB segmentation and/or rate matching ensure that $M_{symb}^{CW}$ is divisible by L.

$$x^{(l)}(i) = d(\mod(Li + M_{symb}^{layer}l, M_{symb}^{CW})), \quad \text{(Equation 3)}$$
$$i = 0, 1, \ldots, M_{symb}^{layer} - 1,$$
$$l = 0, 1, \ldots, L - 1$$
$$M_{symb}^{layer} = M_{symb}^{CW} / L$$

In another embodiment, one CW is mapped onto L layers either in per-symbol or per-CB basis, depending on the number of CBs in the received (DL) or transmitted (UL) TB/CW. An example is illustrated by mapping schemes 750 of FIG. 7B. If the number of CBs in the received (DL) or transmitted (UL) TB/CW is less than an integer value K, symbol-level vertical mapping 760 (cf. equation 1) is used. Else, if the number of CBs in the received (DL) or transmitted (UL) TB/CW is greater than or equal to an integer value K, CB-level vertical mapping 770 is used. The use of CB-level vertical mapping can facilitate the UE to use CB-level MMSE-SIC receiver.

CB-level vertical mapping can be described as follows.

The symbol stream associated with the first CB (CB 0) is mapped to the first layer (layer 0) and first mapped frequency sub-carriers (REs) within a set of allocated PRBs, then, if necessary, across OFDM symbols within a scheduling time unit (slot or subframe). The extent to which the first CB is mapped to the set of allocated PRBs and OFDM symbols within a scheduling time unit depends on the number of CBs in the received (DL) or transmitted (UL) TB/CW.

Then the symbol stream associated with the second CB (CB 1) is mapped to the second layer (layer 1) and first mapped frequency sub-carriers (REs) within a set of allocated PRBs, then, if necessary, across OFDM symbols within a scheduling time unit (slot or subframe). The extent to which the second CB is mapped to the set of allocated PRBs and OFDM symbols within a scheduling time unit depends on the number of CBs in the received (DL) or transmitted (UL) TB/CW and is the same as the first CB.

This is repeated until the symbol stream associated with the L-th CB (CB L−1) which is mapped to the L-th layer (layer L−1) and first mapped frequency sub-carriers (REs) within a set of allocated PRBs, then, if necessary, across OFDM symbols within a scheduling time unit (slot or subframe). The extent to which the second CB is mapped to the set of allocated PRBs and OFDM symbols within a scheduling time unit depends on the number of CBs in the received (DL) or transmitted (UL) TB/CW and is the same as the first CB.

If the number of CBs in the received (DL) or transmitted (UL) TB/CW is larger than L (an integer multiple of L), this mapping process is repeated where the symbol stream associated with the (n+1)-th CB (CB n+1) is mapped to the (mod(n, L)+1)-th layer (layer mod(n, L)). When the CBs are mapped, the L layers as well as the entire set of allocated PRBs and OFDM symbols within a scheduling time unit (slot or subframe) are occupied.

Figure 8:
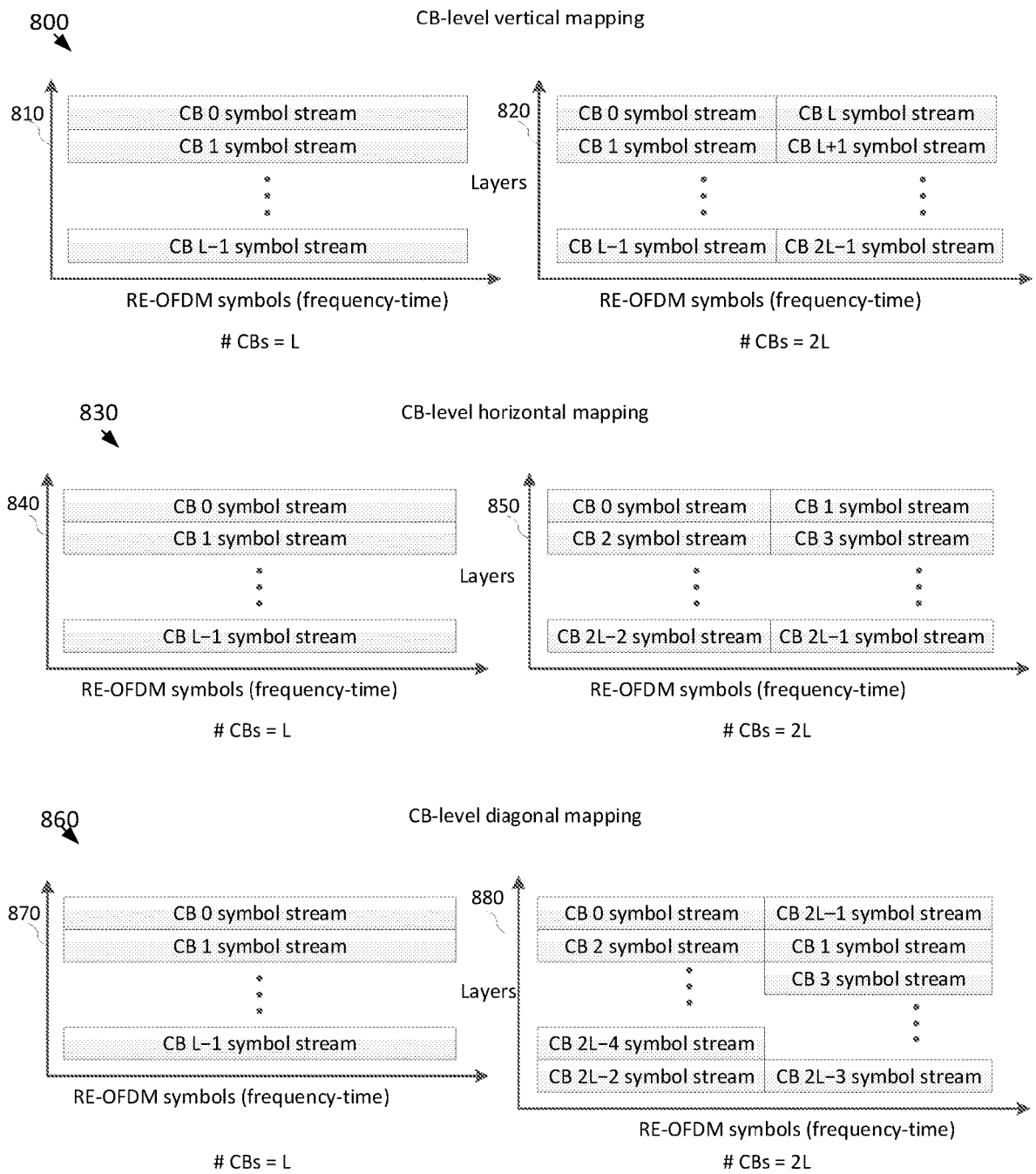
FIG. 8 illustrates an example embodiment for CB-level vertical layer mapping according to an embodiment of the present disclosure.

CB-level vertical mapping 800 is further illustrated in FIG. 8. The number of CBs in the received (DL) or transmitted (UL) TB/CW is an integer multiple of L (μL, where μ≥1). When μ=1, each of the L CBs is mapped to a layer (in this example, CB l is mapped to layer l). Each of the L CBs is mapped across the frequency sub-carriers (REs) within the entire set of allocated PRBs and OFDM symbols within a scheduling time unit (slot or subframe). Therefore, the mapping is first performed across frequency (sub-carriers or resource elements, REs) within one OFDM symbol, then across OFDM symbols within one scheduling time unit (slot or subframe). This is illustrated in embodiment 810. When μ>1, CBs {l+mL, m=0, 1, . . . , μ−1} are mapped to layer l. Given that the total number of REs within the entire set of allocated PRBs across the OFDM symbols within one scheduling time unit (slot or subframe) is $k_{MAX}l_{MAX}$, the first L CBs are mapped across the first $$\frac{k_{MAX}l_{MAX}}{\mu} \text{ REs (in frequency and time)},$$

the second L CBs across the second $$\frac{k_{MAX}l_{MAX}}{\mu} \text{ REs (in frequency and time)},$$

. . . , the last (μ-th) L CBs across the last (μ-th)

$$\frac{k_{MAX}l_{MAX}}{\mu} \text{ REs (in frequency and time)}.$$

An example μ=2 with is illustrated in embodiment 820.

More precisely, given a stream of modulated symbols {d(i)} (indexed by i) formed by serially concatenating the modulated symbols from μL CBs (which is associated with the single CW/TB), the total number of modulated symbols equals $B\mu L = k_{MAX}l_{MAX}L$ where B is the number of modulated symbols per CB and $k_{MAX}l_{MAX}$ the total number of REs within the entire set of allocated PRBs across the OFDM symbols within one scheduling time unit (slot or subframe). Hence, $$B = \frac{k_{MAX}l_{MAX}}{\mu}.$$

All the CBs are of equal size and employ the same MCS. That is, {CB n, CB n+1, . . . , CB n+L−1} share the same CB size B for different values of n. Here, the modulated symbol d(i) is mapped to the stream of modulated symbols associated with layer l as follows:

$$x^{(l)}(i) = d\left(i + lB + (L-1)B \times \left\lfloor \frac{i}{B} \right\rfloor\right), \quad \text{(Equation 4)}$$
$$i = 0, 1, \ldots, M_{symb}^{layer} - 1,$$

-continued $$l = 0, 1, \ldots, L-1$$

$$M_{symb}^{layer} = M_{symb}^{CW}/L = B\mu$$

In an alternative sub-embodiment to the previous paragraph, {CB n, CB n+1, . . . , CB n+L−1} share the same CB size $B_n$ only for a given value of n. For different values of n, however, CB sizes can be different.

In an example of this embodiment, the value of K is fixed to be L (the number of layers). In another example of this embodiment, the value of K is fixed to be an integer multiple of L (µL) where µ≥1 can either be fixed or be configurable.

In an example of this embodiment, the CB-level vertical mapping is replaced by CB-level horizontal mapping. An example of CB-level horizontal mapping 830 is illustrated (with components 840 and 850) in FIG. 8 for L and 2L CBs, respectively. In another example of this embodiment, the CB-level vertical mapping is replaced by CB-level diagonal mapping. An example of CB-level diagonal mapping 860 is illustrated (with components 870 and 880) in FIG. 8 for L and 2L CBs, respectively. Notice that when the number of CBs in the received (DL) or transmitted (UL) TB/CW is L=1), vertical, horizontal, and diagonal CB-level mappings can be the same.

In another embodiment, one CW is mapped onto L layers in per-CB basis (the CB-level vertical mapping as previously described) regardless of the number of CBs in the received (DL) or transmitted (UL) TB/CW. The following additional constraint can be used: when the number of CBs in the received (DL) or transmitted (UL) TB/CW is less than the maximum number of layers supported by the UE, the number of layers assigned to the UE is set to be equal to the number of CBs in the received (DL) or transmitted (UL) TB/CW.

In another embodiment ("configurable layer mapping"), the maximum number of CWs a UE can receive in one PDSCH or PUSCH assignment $N_{CW,MAX}$ can be configured, either via higher-layer (RRC) signaling, MAC control element (MAC CE), or L1 DL control signaling (DL- or UL-related DCI). In this case, the number of CWs a UE receives for a given number of layers L is $N_{CW}$=min(L, $N_{CW,MAX}$). In one example of this embodiment, $N_{CW,MAX}$ can be configured as either 1 or 2. When $N_{CW,MAX}$=1, the layer mapping utilizes one CW mapped onto L layers. Any of the embodiments described above (in FIG. 7A, 7B, or 8) is applicable (for instance, either symbol-level vertical mapping or CB-level vertical mapping). When $N_{CW,MAX}$=2, the layer mapping utilizes $N_{CW}$=min(L, 2) CW(s) mapped onto L layers according to the layer mapping described in embodiment 700 of FIG. 7A. Alternatively, when $N_{CW,MAX}$=2 and the total number of layers received by the UE is ≥2, CW0 is mapped onto $L_0$≥1 layer(s) and CW1 onto $L_1$ layer(s), resulting in a total number of L=$L_0$+$L_1$ layers received by the UE. In this case, each of the CWs can utilize any of the single CW layer mapping embodiments described above (in FIG. 7A, 7B, or 8, symbol-level or CB-level mapping, such as symbol-level vertical mapping or CB-level vertical mapping). Note that for L≥2, $N_{CW,MAX}$ is equal to $N_{CW}$.

In a variation of the above "configurable layer mapping" embodiment, the configurability of $N_{CW,MAX}$ can be made dependent upon the maximum number of rank (or transmission layers) $L_{MAX}$ a UE is configured to receive (DL) or transmit (UL). In one example, when $L_{MAX}$≤2, $N_{CW,MAX}$=$N_{CW}$=1 is used (single CW layer mapping, such as symbol-level vertical mapping or CB-level vertical mapping). Else ($L_{MAX}$>2), $N_{CW,MAX}$ can be configured according to the description in the above paragraph. For instance, in this case $N_{CW,MAX}$ (which is equal to $N_{CW}$) can be configured to be either 1 or 2. In another example, when $L_{MAX}$≤4, $N_{CW,MAX}$=$N_{CW}$=1 is used (single CW layer mapping, such as symbol-level vertical mapping or CB-level vertical mapping). Else, when ($L_{MAX}$>4), $N_{CW,MAX}$ can be configured according to the description in the above paragraph. For instance, in this case $N_{CW,MAX}$ (which is equal to $N_{CW}$) can be configured to be either 1 or 2. In another instance, $N_{CW,MAX}$ (which is equal to $N_{CW}$) can be configured to be either 1, 2, 3, or 4 (or, alternatively, 1, 2, or 4). In another example, when $L_{MAX}$≤2, $N_{CW,MAX}$=$N_{CW}$=1 is used (single CW layer mapping, such as symbol-level vertical mapping or CB-level vertical mapping). Else, when 2<$L_{MAX}$≤4, $N_{CW,MAX}$ (which is equal to $N_{CW}$) can be configured to be either 1 or 2. Else, when 4<$L_{MAX}$≤6, $N_{CW,MAX}$ can be configured to be either 1, 2, or 3. Else, when 6<$L_{MAX}$≤8, $N_{CW,MAX}$ can be configured to be either 1, 2, 3, or 4 (or, alternatively, 1, 2, or 4).

In another variation of the above "configurable layer mapping" embodiment, the number of CWs $N_{CW}$ can be set as a function of the number of transmission layers (rank). In one example, when the number of layers L is 1, 2, 3, or 4, $N_{CW}$ can be set to 1 (single CW layer mapping, such as symbol-level vertical mapping or CB-level vertical mapping). Else, when L is 5, 6, 7, or 8, $N_{CW}$ can be set to 2 (two CWs, where CW0 is mapped onto $\lfloor L/2 \rfloor$ layers and CW1 onto L−$\lfloor L/2 \rfloor$ layers) as depicted in the embodiment illustrated in FIG. 5. In this case, the layer mapping utilized for each of the two CWs is the same as a layer mapping utilized for one CW when L is 1, 2, 3, or 4.

For the above variation embodiment, if symbol-level vertical mapping is used, the layer mapping scheme can be described as follows. When the number of layers L is 1, 2, 3, or 4, $$x^{(l)}(i) = d(Li + l), \qquad \text{(Equation 5)}$$

$$i = 0, 1, \ldots, M_{symb}^{layer} - 1,$$

$$l = 0, 1, \ldots, L-1$$

$$M_{symb}^{layer} = M_{symb}^{CW}/L$$

When the number of layers L is 5, 6, 7, or 8, denoting $d^{(n)}(i)$ as the symbol stream associated with CW−n (n=0, 1), $$x^{(l)}(i) = d^{(0)}(i+l), \, l=0,1,\ldots,\lfloor L/2 \rfloor -1$$

$$x^{(l)}(i) = d^{(1)}(i+l), \, l=\lfloor L/2 \rfloor, \lfloor L/2 \rfloor+1, \ldots, L-1$$

$$i=0,1,\ldots, M_{symb}^{layer}-1, \, M_{symb}^{layer}=M_{symb}^{CW}/\lfloor L/2 \rfloor \qquad \text{(Equation 6)}$$

In yet another variation of the above "configurable layer mapping" embodiment, the number of CWs $N_{CW}$ is set as a function of the number of transmission layers (rank) as follows. When the number of layers L is 1 or 2, $N_{CW}$ can be set to 1 (single CW layer mapping, such as symbol-level vertical mapping or CB-level vertical mapping). Else, when L is 3 or 4, the number of CWs $N_{CW}$ can be configured to either 1 or 2. Else, when L is 5, 6, 7, or 8, the number of CWs $N_{CW}$ can be set to 2.

When the number of CWs is 1, one example layer mapping scheme based on symbol-level vertical mapping can be described in equation (1) for a given value of L. When the number of CWs is 2, one example layer mapping scheme based on symbol-level vertical mapping can be described in equation (6) for a given value of L.

The following embodiments for Component 1 pertain to enhancements when the number of transmission layers L exceeds a certain value and the number of transmitted CWs is 2. For illustrative purposes, frequency-first mapping is used in the following embodiments and sub-embodiments for a given (spatial) layer. Extension to time-first mapping is straightforward to those familiar with the art.

Figure 9A:
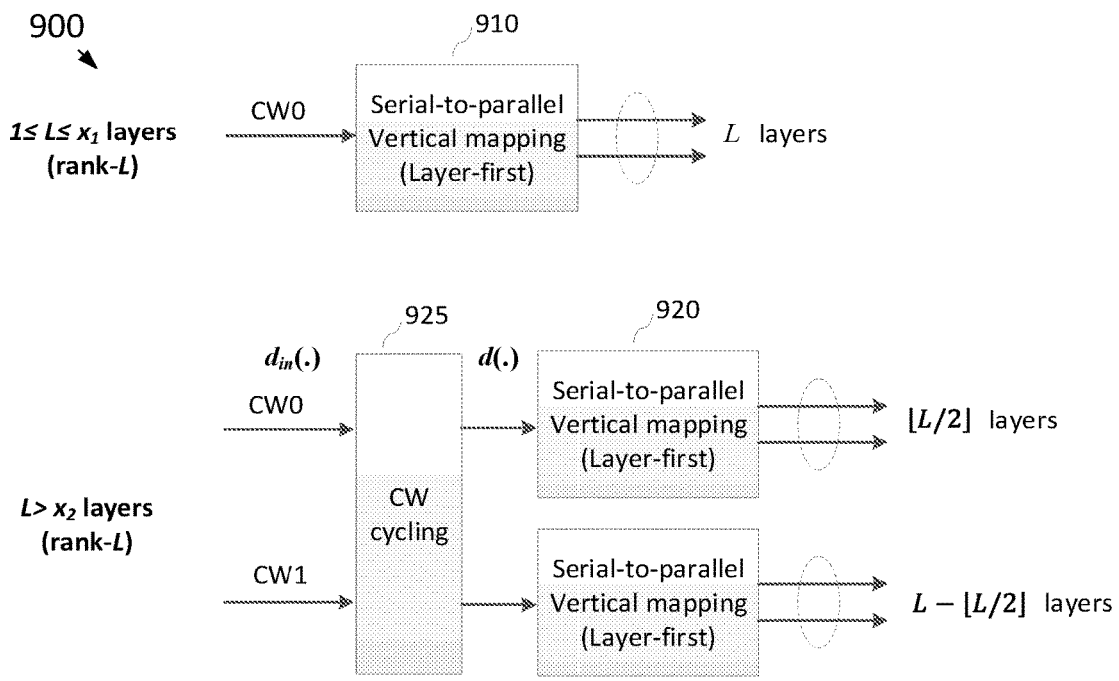
FIG. 9A illustrates an example embodiment for rank-dependent layer mapping with codeword (CW) cycling for higher rank according to an embodiment of the present disclosure.

One embodiment (embodiment I) is illustrated in FIG. 9A. The CW-to-layer mapping 900 in FIG. 9A uses either 1 CW or 2 CWs depending on the number of transmission layers or rank L. When $1 \leq L \leq x_1$, 1-CW mapping is used (910). When $L > x_2$, 2-CW mapping is used (920+925) with an additional component termed "CW cycling" (925). The values of $x_1$ and $x_2$ can be equal or different. For example, for $x_1 = x_2 = x$, x can be 2, or 4. Alternatively, if $x_1 > x_2$ (e.g. $x_1 = 4$, $x_2 = 2$), the mapping can be configured between the 1-CW mapping in 810 and the 2-CW mapping in 920+925 when L=4.

Each of the two mapping blocks (910 or 920) maps one CW onto at least one layer. In FIG. 9A, the first CW (CW0) is mapped onto $\lfloor L/2 \rfloor$ layers whereas the second CW (CW1) is mapped onto $L - \lfloor L/2 \rfloor$ layers. At least three mapping schemes can be used: vertical, diagonal, and horizontal. The symbol-level mapping scheme performs a mapping from a stream of modulated symbols (from one CW) to at least one layer across the allocated frequency and time resources. For illustrative purposes, vertical mapping is used in the following example embodiments. Extension to diagonal or horizontal mapping is straightforward to those familiar with the art.

For symbol-level vertical mapping, the stream of symbols is mapped first across L layers, then across frequency sub-carriers (REs) within a set of allocated PRBs, then across OFDM symbols within a scheduling time unit (slot or subframe). Denoting $M_{symb}^{layer}$, $M_{symb}^{CW}$, $x^{(l)}(i)$, and $d(i)$ as the number of symbols per layer, the number of symbols in one CW, symbol stream for layer l, and symbol stream for the CW, respectively, the CW-to-layer mapping can be described as follows. Here, CB segmentation and/or rate matching ensure that $M_{symb}^{CW}$ is divisible by L. When the number of layers L is such that $1 \leq L \leq x_1$ $$x^{(l)}(i) = d(Li + l), \quad \text{(Equation 7)}$$
$$i = 0, 1, \ldots, M_{symb}^{layer} - 1,$$
$$l = 0, 1, \ldots, L - 1$$
$$M_{symb}^{layer} = M_{symb}^{CW}/L$$

Else, when $L > x_2$, denoting $d^{(n)}(i)$ as the symbol stream associated with CWn (n=0,1)

$$x^{(l)}(i) = d^{(0)}(\lfloor L/2 \rfloor i + l), \quad \text{(Equation 8)}$$
$$l = 0, 1, \ldots, \lfloor L/2 \rfloor - 1,$$
$$i = 0, 1, \ldots, \frac{M_{symb}^{CW0}}{\lfloor L/2 \rfloor} - 1$$
$$x^{(l)}(i) = d^{(1)}((L - \lfloor L/2 \rfloor)i + l - \lfloor L/2 \rfloor),$$

-continued
$$l = \lfloor L/2 \rfloor, \lfloor L/2 \rfloor + 1, \ldots, L - 1,$$
$$i = 0, 1, \ldots, \frac{M_{symb}^{CW1}}{L - \lfloor L/2 \rfloor} - 1$$

Or equivalently, $$x^{(l)}(i) = d^{(0)}(\lfloor L/2 \rfloor i + l),$$
$$l = 0, 1, \ldots, \lfloor L/2 \rfloor - 1,$$
$$i = 0, 1, \ldots, M_{symb}^{layer} - 1$$
$$x^{(l+\lfloor L/2 \rfloor)}(i) = d^{(1)}((L - \lfloor L/2 \rfloor)i + l),$$
$$l = 0, 1, \ldots, L - \lfloor L/2 \rfloor - 1,$$
$$i = 0, 1, \ldots, M_{symb}^{layer} - 1$$
$$M_{symb}^{layer} = \frac{M_{symb}^{CW0}}{\lfloor L/2 \rfloor} = \frac{M_{symb}^{CW1}}{L - \lfloor L/2 \rfloor}$$

The CW cycling 925 is used to facilitate the control signaling overhead of 1-CW transmission for 2-CW transmission. This can be done, for example, by ensuring that each of the 2 CWs (or each of the code blocks/CBs in each of the 2 CWs) is transmitted across the L layers. In one example, CW cycling can be performed by intermittently swapping two groups of Δ symbols between CW0 and CW1. This can be described as follows. Denoting the input and output to CW cycling as $\{d_{in}^{(0)}(i), d_{in}^{(1)}(n)\}$ and $\{d^{(0)}(i), d^{(1)}(i)\}$, respectively, the CW cycling operation can be described as follows:

$$d^{(0)}(i) = d_{in}^{(0)}(i), \quad \text{(Equation 9)}$$
$$d^{(1)}(i) = d_{in}^{(1)}(i),$$
$$i \in \{2k\Delta, 2k\Delta + 1, \ldots, (2k+1)\Delta - 1\}$$
$$d^{(0)}(i) = d_{in}^{(1)}(i),$$
$$d^{(1)}(i) = d_{in}^{(0)}(i),$$
$$i \in \{(2k+1)\Delta, (2k+1)\Delta + 1, \ldots, (2k+2)\Delta - 1\}$$
$$k = 0, 1, \ldots, \frac{M_{symb}^{CW}}{2\Delta} - 1$$

To ensure that each CB in a CW is mapped across the L layers more or less evenly as well as the layers are symbol-level, Δ can be chosen as described in equation (10). The values of Δ for different values of L are given in TABLE 1. Note that each of the Δ values in TABLE 1 is applicable only when 2-CW transmission is used for the corresponding value of L. For instance, when $x_1 = x_2 = 4$ in equation (7)-(8), CW cycling is used only for L>4. Therefore, the relevant Δ values are only those corresponding to L=5, 6, 7, and 8.

$$\Delta = \begin{cases} L/2 & \mod(L, 2) = 0 \\ \lfloor L/2 \rfloor(L - \lfloor L/2 \rfloor) & \mod(L, 2) = 1 \end{cases} \quad \text{(Equation 10)}$$

TABLE 1

| L | Δ |
|---|---|
| 2 | 1 |
| 3 | 2 |
| 4 | 2 |
| 5 | 6 |
| 6 | 3 |
| 7 | 12 |
| 8 | 4 |

Figure 9B:
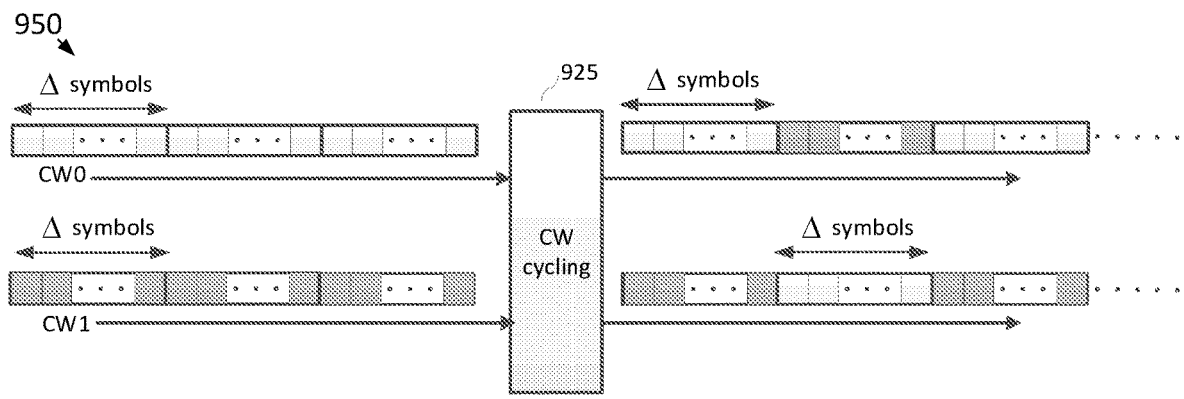
FIG. 9B illustrates an example embodiment for CW cycling according to an embodiment of the present disclosure.

The above example of CW cycling 925 can be illustrated in mapping 950 of FIG. 9B. As illustrated, a group/block of A symbols from CW0 is swapped with that from CW1 in every other group/block of A symbols. To further illustrate this operation, using symbol-level vertical mapping described in equation (8), with the values of A given in TABLE 1, the following two cases are considered.

First, when mod(L, 2)=0, the symbol sequence associated with each of the two CWs is mapped across the L layers in the following manner:

$$\{d_{in}^{(0)}(0), d_{in}^{(0)}(1), \ldots, d_{in}^{(0)}\left(\frac{L}{2}-1\right),$$
$$d_{in}^{(0)}\left(\frac{L}{2}\right), d_{in}^{(0)}\left(\frac{L}{2}+1\right), \ldots, d_{in}^{(0)}(L-1), \ldots\} \rightarrow$$
$$\{x^{(0)}(0), x^{(1)}(0), \ldots, x^{(\frac{L}{2}-1)}(0), x^{(\frac{L}{2})}(1),$$
$$x^{(\frac{L}{2}+1)}(1), \ldots, x^{(L-1)}(1), \ldots\}$$

$$\{d_{in}^{(1)}(0), d_{in}^{(1)}(1), \ldots, d_{in}^{(1)}\left(\frac{L}{2}-1\right), d_{in}^{(1)}\left(\frac{L}{2}\right),$$
$$d_{in}^{(1)}\left(\frac{L}{2}+1\right), \ldots, d_{in}^{(1)}(L-1), \ldots\} \rightarrow$$
$$\{x^{(\frac{L}{2})}(0), x^{(\frac{L}{2}+1)}(0), \ldots, x^{(L-1)}(0), x^{(0)}(1),$$
$$x^{(1)}(1), \ldots, x^{(\frac{L}{2}-1)}(1), \ldots\}$$

(Equation 11)

Second, when mod(L, 2)=1, the symbol sequence associated with each of the two CWs is mapped across the L layers in the following manner. For illustrative purposes, L=5 (hence Δ=6) is used.

(Equation 12)
$$\{d_{in}^{(0)}(0), d_{in}^{(0)}(1), d_{in}^{(0)}(2), d_{in}^{(0)}(3), d_{in}^{(0)}(4), d_{in}^{(0)}(5), d_{in}^{(0)}(6),$$
$$d_{in}^{(0)}(7), d_{in}^{(0)}(8), d_{in}^{(0)}(9), d_{in}^{(0)}(10), d_{in}^{(0)}(11), \ldots\} \rightarrow$$
$$\{x^{(0)}(0), x^{(1)}(0), x^{(0)}(1), x^{(1)}(1), x^{(0)}(2), x^{(1)}(2), x^{(2)}(3), x^{(3)}(3),$$
$$x^{(4)}(3), x^{(2)}(4), x^{(3)}(4), x^{(4)}(4), \ldots\}$$

$$\{d_{in}^{(1)}(0), d_{in}^{(1)}(1), d_{in}^{(1)}(2), d_{in}^{(1)}(3), d_{in}^{(1)}(4), d_{in}^{(1)}(5), d_{in}^{(1)}(6),$$
$$d_{in}^{(1)}(7), d_{in}^{(1)}(8), d_{in}^{(1)}(9), d_{in}^{(1)}(10), d_{in}^{(1)}(11), \ldots\} \rightarrow$$
$$\{x^{(2)}(0), x^{(3)}(0), x^{(4)}(0), x^{(2)}(1), x^{(3)}(1), x^{(4)}(1),$$
$$x^{(0)}(2), x^{(1)}(2), x^{(0)}(3), x^{(1)}(3), x^{(0)}(4), x^{(1)}(4), \ldots\}$$

In a variation of this embodiment, CW cycling functionality can be turned ON or OFF (hence configurable for a UE). For example, CW cycling can be turned ON for a UE (by a gNB or the NW) when a SU-MIMO transmission is performed while it can be turned OFF when a UE receives transmission(s) from multiple TRPs. This configuration can be signaled either via higher-layer (e.g. RRC) signaling, MAC CE, or L1 DL control signaling (UL- or DL-related DCI). This is applicable when the number of transmission layers L>$x_2$.

Figure 10:
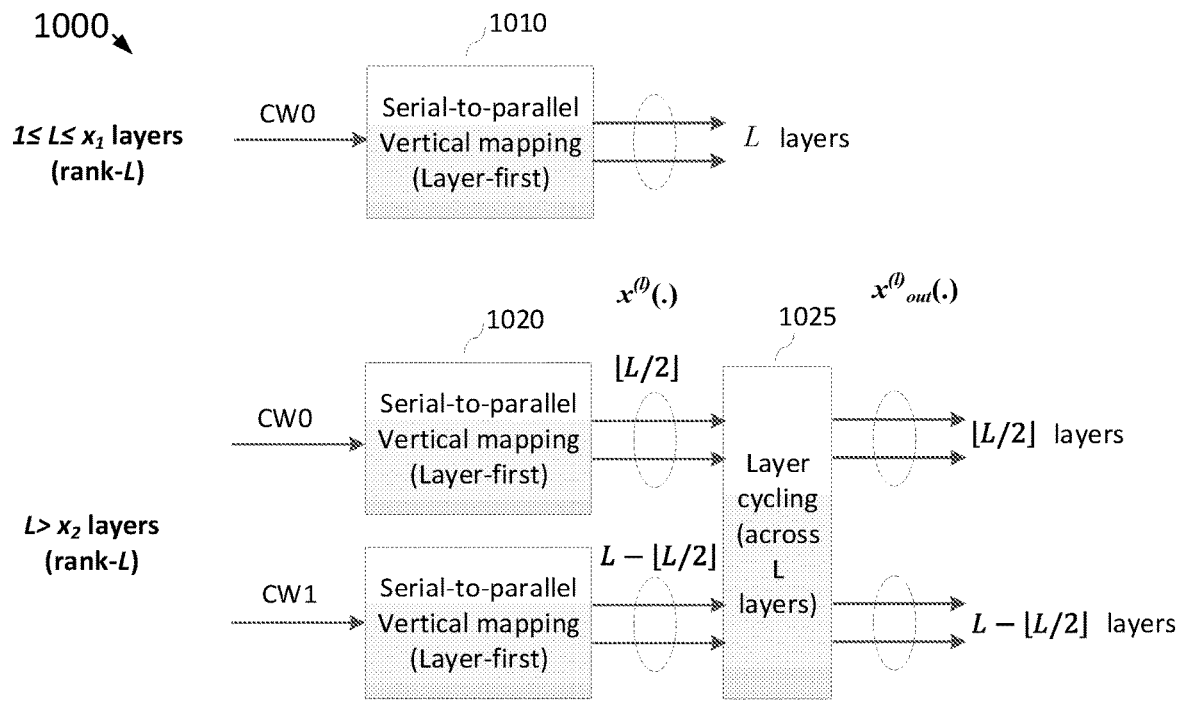
FIG. 10 illustrates an example embodiment for rank-dependent layer mapping with codeword (CW) cycling for higher rank according to an embodiment of the present disclosure.

Another embodiment (embodiment II) is illustrated in FIG. 10. The CW-to-layer mapping 1000 in FIG. 10 uses either 1 CW or 2 CWs depending on the number of transmission layers or rank L. When $1 \leq L \leq x_1$, 1-CW mapping is used (1010). When L>$x_2$, 2-CW mapping is used (1020+1025) with an additional component termed "layer cycling" (1025). The values of $x_1$ and $x_2$ can be equal or different. For example, for $x_1=x_2=x$, x can be 2, or 4. Alternatively, if $x_1>x_2$ (e.g. $x_1=4$, $x_2=2$), the mapping can be configured between the 1-CW mapping in 1010 and the 2-CW mapping in 1020+1025 when L=4.

Each of the two mapping blocks (1010 or 1020) maps one CW onto at least one layer in an analogous manner to those for embodiment I (blocks 910 and 920). Therefore, the above description for 810 and 820 applies to 1010 and 1020, including equations (7) and (8). The layer cycling 1025, just as CW cycling, is used to facilitate the control signaling overhead of 1-CW transmission for 2-CW transmission. This can be done, for example, by ensuring that each of the 2 CWs (or each of the code blocks/CBs in each of the 2 CWs) is transmitted across the L layers. In one example, layer cycling across L layers can be performed by cyclically permuting the L layers in symbol-level. This operation can guarantee that symbols within each CW are spread across the L layers more or less evenly. This symbol-level permutation can be described as follows:

$$x_{out}^{(l)}(i) = x^{(\pi(l+i))}(i),$$

$$\pi(l+i) = \text{mod}(l+i, L), l=0,1,\ldots,L-1 \quad \text{(Equation 13)}$$

Alternatively, this example of layer cycling can be described in terms of precoding as follows:

$$\begin{bmatrix} x_{out}^{(0)}(i) \\ x_{out}^{(1)}(i) \\ \ldots \\ x_{out}^{(L-1)}(i) \end{bmatrix} = [e_{\pi(i)} \; e_{\pi(i+1)} \; \ldots \; e_{\pi(i+L-1)}] \begin{bmatrix} x^{(0)}(i) \\ x^{(1)}(i) \\ \ldots \\ x^{(L-1)}(i) \end{bmatrix} \quad \text{(Equation 14)}$$

$$\pi(l+i) = \text{mod}(l+i, L), l=0,1,\ldots,L-1$$

Here, $e_k$ is a length-L vector whose k-th element is 1 and 0 elsewhere (k=0, 1, ..., L−1).

To further illustrate this operation, using symbol-level vertical mapping described in equation (8), the above example for layer cycling can be illustrated by the following mapping operation (across layers and symbol indices i):

$$\begin{bmatrix} x^{(0)}(0) & x^{(0)}(1) & \cdots & x^{(0)}(L-1) \\ x^{(1)}(0) & x^{(1)}(1) & \cdots & x^{(1)}(L-1) \\ \vdots & \vdots & \ddots & \vdots \\ x^{(L-2)}(0) & x^{(L-2)}(1) & \cdots & x^{(L-2)}(L-1) \\ x^{(L-1)}(0) & x^{(L-1)}(1) & \cdots & x^{(L-1)}(L-1) \end{bmatrix} \rightarrow$$

(Equation 15)

$$\begin{bmatrix} x_{out}^{(0)}(0) & x_{out}^{(L-1)}(1) & \cdots & x_{out}^{(1)}(L-1) \\ x_{out}^{(1)}(0) & x_{out}^{(0)}(1) & \cdots & x_{out}^{(2)}(L-1) \\ \vdots & \vdots & \ddots & \vdots \\ x_{out}^{(L-2)}(0) & x_{out}^{(L-3)}(1) & \cdots & x_{out}^{(L-1)}(L-1) \\ x_{out}^{(L-1)}(0) & x_{out}^{(L-2)}(1) & \cdots & x_{out}^{(0)}(L-1) \end{bmatrix}$$

In a variation of this embodiment, layer cycling functionality can be turned ON or OFF (hence configurable for a UE). For example, layer cycling can be turned ON for a UE (by a gNB or the NW) when a SU-MIMO transmission is performed while it can be turned OFF when a UE receives transmission(s) from multiple TRPs. This configuration can be signaled either via higher-layer (e.g. RRC) signaling, MAC CE, or L1 DL control signaling (UL- or DL-related DCI). This is applicable when the number of transmission layers $L > x_2$.

The above two embodiments can also be extended for scenarios with the number of CWs larger than 2. Such extensions are straightforward to those familiar with the art.

In each of the two embodiments, the gNB/NW can configure different values of $(x_1, x_2)$ for DL and UL for a UE. The values of $x_1$ and/or $x_2$ can also be configurable for a UE.

In another embodiment (embodiment III), when a UE is configured for receiving 2 CWs and the total number of layers across the 2 CWs (=L) is either 5, 6, 7, or 8, instead of a fixed correspondence (previously described), a flexible correspondence between the 2 CWs and the L layers can be used.

In a sub-embodiment (III.1), a fully flexible correspondence adds onto the fixed correspondence the following features. A first feature is that for a given number of layers L (>4), each of the 2 CWs can correspond to different number of layers. Without any constraint, the second column of TABLE 2 outlines possible combinations of $(L_0, L_1)$ where $L_n$ denotes the number of layers associated with CW-n. The boldfaced combinations are the ones used for LTE fixed correspondence. Therefore, for a given value of L, there are (L−1) possibilities. A second feature is that for a given number of layers for CW-n $L_n$ which can take value from {1, 2, 3, 4, 5, 6, 7}, the set of layers associated with CW-n, along with its permutations, can also vary. Therefore, for a given L and $L_0$, there are $$\frac{L!}{L_0!(L-L_0)!} \times (L-L_0)! = \frac{L!}{L_0!}$$

possibilities.

TABLE 2

All possible number of layers for each of the 2 CWs

| | | Reduced possible combinations of ($L_0$, $L_1$) | | |
|---|---|---|---|---|
| L | All possible combinations of ($L_0$, $L_1$)-embodiment III.1 | Embodiment III.2 | Embodiment III.3 | Embodiment III.4 |
| 5 | (1, 4), (2, 3), (3, 2), (4, 1) | (1, 4), (2, 3) | (1, 4), (2, 3), (3, 2), (4, 1) | (1, 4), (2, 3) |
| 6 | (1, 5), (2, 4), (3, 3), (4, 2), (5, 1) | (1, 5), (2, 4), (3, 3) | (2, 4), (3, 3), (4, 2) | (2, 4), (3, 3) |
| 7 | (1, 6), (2, 5), (3, 4), (4, 3), (5, 2), (6, 1) | (1, 6), (2, 5), (3, 4) | (3, 4), (4, 3) | (3, 4) |
| 8 | (1, 7), (2, 6), (3, 5), (4, 4), (5, 3), (6, 2), (7, 1) | (1, 7), (2, 6), (3, 5), (4, 4) | (4, 4) | (4, 4) |

Thus, for a given value of L, the total number of possible correspondences is $$\Sigma_{L_0=1}^{L-1} \frac{L!}{L_0!}.$$

This results in 205, 1236, 8659, and 69280 possibilities for L=5, 6, 7, and 8, respectively. As this correspondence needs to be signaled in DCI (DL) and/or CSI reporting (UL), it requires up to 17-bit signaling field.

In a sub-embodiment (III.2), the fully flexible correspondence in III.1 is further restricted in the following manner. Only the combinations with $L_0 \leq L_1$ are included. This is outlined in the third column of TABLE 2.

In a sub-embodiment (III.3), the fully flexible correspondence in III.1 is further restricted in the following manner. First, any functionality of the features which deals with ordering across layers (as in scheme 2 and 6) can be removed since it is expected that such functionality, if beneficial, is taken care of by precoding (i.e. ordering/permutation is a special case of phase rotation). This is a reasonable assumption as long as the codebooks are designed with sufficiently high spatial resolution. Second, to ensure that no new layer mapping scheme (mapping of one CW to ≥1 layers) is introduced, possibilities that require $L_n > 4$ should be removed. If the above two criteria are applied to designing a scheme for flexible correspondence, the remaining possible combinations of $(L_0, L_1)$ are outlined in the fourth column of TABLE 2. This leaves us with (9−L) combinations for a given value of L. In addition, feature 2 disappears, resulting in the total number of possibilities of (9−L) for a given value of L (which requires at most 2 bits). This variable correspondence scheme can be described as follows. The $1^{st}$ $L_0$ layers correspond to the first CW (CW0), where $L_0 \in \{L-4, \ldots\}$ whereas the remaining (L−$L_0$) layers correspond to the second CW (CW1).

In a sub-embodiment (III.4), the fully flexible correspondence in III.3 is further restricted in the following manner. Only the combinations with $L_0 \leq L_1$ are included. This is outlined in the fifth column of TABLE 2.

In other sub-embodiments of II, any subset of the combinations in TABLE 2 can be used.

For the second component (that is, signaling support), several example embodiments based on the embodiments for Component 1 are described below.

Example embodiments of UL signaling for DL reception with one CW per UE are as follows.

In one embodiment, a UE signals only one DL HARQ-ACK (hence 1 bit) per component carrier. This 1-bit HARQ-ACK is transmitted by the UE via an UL control channel.

In another embodiment, a UE is configured to report CSI which includes only one CQI component per subband regardless of the recommended number of layers or rank. For wideband CQI (here the term wideband CQI refers to a single CQI associated with the subbands in the reporting set). If the rank indicator (RI) reports L as the number of recommended layers or rank, this single CQI (per subband or for subbands in the reporting set) is calculated assuming transmission across the L layers.

In one embodiment pertaining to the "configurable layer mapping", an uplink control information (UCI) includes a maximum of $N_{CW,MAX}$ CQI(s) representing the CQI associated with $N_{CW,MAX}$ CW(s). The value of $N_{CW,MAX}$ is the maximum number of CWs a UE can receive within one PDSCH assignment. In this case, the number of CQI(s) in a UCI can be 1, 2, ..., or $N_{CW}$ depending on the value of RI. When the UE is configured with subband CQI reporting, this number of CQIs represents the number of CQIs per subband. When the UE is configured with wideband or partial band CQI reporting, this number of CQIs represents the number of CQIs for the subbands within the configured reporting band.

In the above embodiments and their variations, instead of signaling and/or configuring the maximum number of CWs $N_{CW,MAX}$ that a UE can receive within one PDSCH assignment, the maximum total number of layers across the CWs $L_{MAX}$ can be signaled and/or configured. This parameter can be signaled via higher-layer (RRC) signaling or L1/L2 control channel. In this case, the number of CQI(s) in a UCI can be 1, 2, ..., or $N_{CW,MAX}$ depending on the value of RI where $N_{CW,MAX}$ is the number of CWs associated with $L_{MAX}$. When the UE is configured with subband CQI reporting, this number of CQIs represents the number of CQIs per subband. When the UE is configured with wideband or partial band CQI reporting, this number of CQIs represents the number of CQIs for the subbands within the configured reporting band.

When the maximum total number of layers across the CWs $L_{MAX}$ is signaled and/or configured, example embodiments for DL-related DCI design are as follows. In one example embodiment where one-CW transmission is used for L≤4 and two-CW transmission is used for L>4, if $L_{MAX} \leq 4$, the UCI includes only one CQI which corresponds to one CW. Else, if $L_{MAX} > 4$, the UCI includes either one or two CQIs depending on the value of RI, wherein each of the two CQIs corresponds to one of the two CWs. When the UE is configured with subband CQI reporting, this number of CQIs represents the number of CQIs per subband. When the UE is configured with wideband or partial band CQI reporting, this number of CQIs represents the number of CQIs for the subbands within the configured reporting band.

In the above embodiments and their variations, instead of signaling and/or configuring the maximum number of CWs $N_{CW,MAX}$ or the maximum number of layers across the CWs $L_{MAX}$, the maximum number of CQI(s) in a UCI can be signaled and/or configured. For example, this maximum number of CQI(s) in a UCI can be configured as either 1 or 2. If this maximum number is 1, the number of CQI(s) in a UCI is one. If this maximum number is 2, the number of CQI(s) in a UCI can be either 1 or 2, depending on the value of RI. For example, if RI≤4, only one CQI is reported in the UCI. If RI>4, two CQIs are reported in the UCI. When the UE is configured with subband CQI reporting, this number of CQIs represents the number of CQIs per subband. When the UE is configured with wideband or partial band CQI reporting, this number of CQIs represents the number of CQIs for the subbands within the configured reporting band.

When two CQIs (associated with two CWs) are reported, several options are possible. In a first option, two full CQIs (each associated with one CW) are reported. In a second option, one of the CQIs is reported relative to the other CQI (for instance in a differential manner) so that this CQI can be reported in fewer bits than the other CQI. When the UE is configured with subband CQI reporting, this number of CQIs represents the number of CQIs per subband. When the UE is configured with wideband or partial band CQI reporting, this number of CQIs represents the number of CQIs for the subbands within the configured reporting band.

Example embodiments of DL signaling for DL reception with one CW per UE are as follows.

In one embodiment, a DL-related DCI (downlink control information) includes only one MCS parameter representing the assigned MCS associated with the single TB or CW, regardless of the number of layers. In addition, the DL-related DCI can include one set of HARQ-related parameter (such as New Data Indicator and/or Redundancy Version) associated with the single TB or CW, regardless of the number of layers. If CB-level or CB-group-level HARQ is supported, multiple sets of HARQ-related parameters can be included in the DL-related DCI. This DL-related DCI is received by the UE via a DL control channel.

In another embodiment, if the value of K in embodiment 1000 of FIG. 10 is configurable, the parameter K is signaled to the UE via higher-layer (RRC) signaling. Alternatively, the value of K can be configured dynamically either via MAC control element (CE) or L1 DL control signaling.

In one embodiment pertaining to the "configurable layer mapping", a DL-related DCI (downlink control information) includes $N_{CW,MAX}$ MCS field(s) representing the assigned MCS associated with $N_{CW,MAX}$ CW(s). The value of $N_{CW,MAX}$ is the maximum number of CWs a UE can receive within one PDSCH/PUSCH assignment. In addition, the DL-related DCI can include $N_{CW,MAX}$ set(s) of HARQ-related parameter (such as New Data Indicator and/or Redundancy Version) associated with the single TB or CW, regardless of the number of layers. If CB-level or CB-group-level HARQ is supported, the number of sets of HARQ-related parameters included in the DL-related DCI can be multiplied by the number of CBs or CB-groups. The value of $N_{CW,MAX}$ can be configured either via higher-layer (RRC) signaling, MAC control element (MAC CE), or L1 DL control signaling (DL- or UL-related DCI). If configured via higher-layer or MAC CE signaling, a UE first receives the configuration information. Then the UE can determine the number of MCS and HARQ-related fields in a received DL-related DCI. If configured via L1 DL controls signaling, the value of $N_{CW,MAX}$ can be signaled in a same DL-related DCI as the $N_{CW,MAX}$ MCS field(s) and $N_{CW,MAX}$ HARQ-related field(s). Alternatively, the value of $N_{CW,MAX}$ can be implicitly detected from blindly decoding the DCI and inferring it from the DCI size (which varies depending at least on the number of MCS and HARQ-related fields). Alternatively, when L1 DL control signaling is used for configuring the number of CWs, instead of signaling $N_{CW,MAX}$, the number of CWs $N_{CW}$ itself is signaled either explicitly in the DCI or implicitly detected from the DCI size (wherein the DCI includes $N_{CW}$ MCS fields and $N_{CW}$ HARQ-related fields). Unlike $N_{CW,MAX}$, $N_{CW}$ can vary across different DL assignments while $N_{CW,MAX}$ is configured.

The above embodiment applies whenever $N_{CW,MAX}$ is made configurable.

In one sub-embodiment of this embodiment, the total number of layers across the CWs L is signaled in a single DCI field in the DL-related DCI.

In another sub-embodiment of this embodiment, the number of layers (0, 1, ..., $L_{MAX}^{CW}$) associated with each of the $N_{CW,MAX}$ MCS and/or HARQ-related DCI fields is signaled as one DCI field in the DL-related DCI. Therefore, there are $N_{CW,MAX}$ DCI fields indicating the number of layers for $N_{CW,MAX}$ CW(s). The value of $N_{CW,MAX}$ can be configured as previously described. The parameter $L_{MAX}^{CW}$ denotes the maximum number of layers per CW.

In another sub-embodiment of this embodiment, the number of layers (0, 1, ..., $L_{MAX}^{CW}$) associated with each of the $N_{CW}$ MCS and/or HARQ-related DCI fields is signaled as one DCI field in the DL-related DCI. Therefore, there are $N_{CW}$ DCI fields indicating the number of layers for $N_{CW}$ CW(s). The parameter $L_{MAX}^{CW}$ denotes the maximum number of layers per CW.

In the above embodiments and their variations, instead of signaling and/or configuring the maximum number of CWs $N_{CW,MAX}$ that a UE can receive within one PDSCH assignment, the maximum total number of layers across the CWs $L_{MAX}$ can be signaled and/or configured. This parameter can be signaled via higher-layer (RRC) signaling or L1/L2 control channel. Optionally, the maximum number of layers for each CW $L_{MAX}^{CW}$ can be signaled and/or configured. Likewise, this parameter can be signaled via higher-layer (RRC) signaling or L1/L2 control channel.

When the maximum total number of layers across the CWs $L_{MAX}$ is signaled and/or configured, example embodiments for DL-related DCI design are as follows. In one example embodiment where one-CW transmission is used for L≤4 and two-CW transmission is used for L>4, if $L_{MAX}$≤4, the DCI includes one MCS field and/or one set of HARQ-related DCI fields wherein the single MCS field and the single HARQ field set correspond to one CW. Else, if $L_{MAX}$>4, the DCI includes two MCS fields and/or two sets of HARQ-related DCI fields wherein each of the two MCS fields and each of the two HARQ field sets correspond to one of the two CWs. In case of $L_{MAX}$>4 (the maximum total number of layers configured for the UE) and L≤4 (the total number of layers assigned for the UE in a particular/scheduled DL assignment), only one of the two MCS field is used to indicate the MCS for the one CW. The second MCS field can be used to signal other hypotheses. In case of $L_{MAX}$>4 (the maximum total number of layers configured for the UE) and L>4 (the total number of layers assigned for the UE in a particular/scheduled DL assignment), each of the two MCS fields is used to indicate an MCS for one of the two CWs.

Therefore, for a same DL-related DCI format, the number of MCS fields depends on the maximum total number of layers per PDSCH assignment per UE.

In the above embodiments and their variations, instead of signaling and/or configuring the maximum number of CWs $N_{CW,MAX}$ or the maximum number of layers across the CWs $L_{MAX}$, the maximum number of MCS fields and/or set(s) of HARQ-related DCI fields in a DL-related DCI can be signaled and/or configured. For example, this maximum number can be configured as either 1 or 2. The maximum number of MCS fields and/or the maximum number of set(s) of HARQ-related DCI fields can be configured either jointly (as one common parameter) or separately.

Instead of the maximum number, the number of MCS fields and/or set(s) of HARQ-related DCI fields in a DL-related DCI can be signaled and/or configured. This parameter can be signaled via higher-layer (RRC) signaling or L1/L2 control channel. For example, this number can be configured as either 1 or 2. The number of MCS fields and/or the maximum number of set(s) of HARQ-related DCI fields can be configured either jointly (as one common parameter) or separately.

When the number (or the maximum number) of MCS fields and/or set(s) of HARQ-related DCI fields in a DL-related DCI is configured as 2 while the assigned number of CWs (or layers) for the DL-related DCI corresponds to one CW, only one of the two MCS field is used to indicate the MCS for the one CW. The second MCS field can be used to signal other hypotheses. When the number (or the maximum number) of MCS fields and/or set(s) of HARQ-related DCI fields in a DL-related DCI is configured as 2 while the assigned number of CWs (or layers) for the DL-related DCI corresponds to two CWs, each of the two MCS fields is used to indicate an MCS for one of the two CWs.

Example embodiments of DL signaling for UL transmission with one CW per UE are as follows.

In one embodiment, an UL-related DCI (downlink control information) includes only one MCS parameter representing the assigned MCS associated with the single TB or CW, regardless of the number of layers. In addition, the UL-related DCI can include one set of HARQ-related parameter (such as New Data Indicator and/or Redundancy Version) associated with the single TB or CW, regardless of the number of layers. If CB-level or CB-group-level HARQ is supported, multiple sets of HARQ-related parameters can be included in the UL-related DCI. This UL-related DCI is received by the UE via a DL control channel.

In one embodiment pertaining to the "configurable layer mapping", an UL-related DCI (downlink control information) includes $N_{CW,MAX}$ MCS field(s) representing the assigned MCS associated with $N_{CW}$ CW(s). The value of $N_{CW,MAX}$ is the maximum number of CWs a UE can receive within one PDSCH/PUSCH assignment. In addition, the UL-related DCI can include $N_{CW}$ set(s) of HARQ-related parameter (such as New Data Indicator and/or Redundancy Version) associated with the single TB or CW, regardless of the number of layers. If CB-level or CB-group-level HARQ is supported, the number of sets of HARQ-related parameters included in the UL-related DCI can be multiplied by the number of CBs or CB-groups. The value of $N_{CW,MAX}$ can be configured either via higher-layer (RRC) signaling, MAC control element (MAC CE), or L1 DL control signaling (DL- or UL-related DCI). If configured via higher-layer or MAC CE signaling, a UE first receives the configuration information. Then the UE can determine the number of MCS and HARQ-related fields in a received UL-related DCI. If configured via L1 DL controls signaling, the value of $N_{CW,MAX}$ can be signaled in a same UL-related DCI as the $N_{CW,MAX}$ MCS field(s) and $N_{CW,MAX}$ HARQ-related field(s). Alternatively, the value of $N_{CW,MAX}$ can be implicitly detected from blindly decoding the DCI and inferring it from the DCI size (which varies depending at least on the number of MCS and HARQ-related fields). Alternatively, when L1 DL control signaling is used for configuring the number of CWs, instead of signaling $N_{CW,MAX}$, the number of CWs $N_{CW}$ itself is signaled—either explicitly in the DCI or implicitly detected from the DCI size (wherein the DCI includes $N_{CW}$ MCS fields and $N_{CW}$ HARQ-related fields). Unlike $N_{CW}$ $N_{CW}$ can vary across different UL assignments while $N_{CW,MAX}$ is configured.

The above embodiment applies whenever $N_{CW,MAX}$ is made configurable.

In one sub-embodiment of this embodiment, the total number of layers across the CWs L is signaled in a single DCI field in the UL-related DCI.

In another sub-embodiment of this embodiment, the number of layers $(0, 1, \ldots, L_{MAX}^{CW})$ associated with each of the $N_{CW,MAX}$ MCS and/or HARQ-related DCI fields is signaled as one DCI field in the UL-related DCI. Therefore, there are $N_{CW,MAX}$ DCI fields indicating the number of layers for $N_{CW,MAX}$CW(s). The value of $N_{CW,MAX}$ can be configured as previously described. The parameter $L_{MAX}^{CW}$ denotes the maximum number of layers per CW.

In another sub-embodiment of this embodiment, the number of layers $(0, 1, \ldots, L_{MAX}^{CW})$ associated with each of the $N_{CW}$ MCS and/or HARQ-related DCI fields is signaled as one DCI field in the UL-related DCI. Therefore, there are $N_{CW}$ DCI fields indicating the number of layers for $N_{CW}$ CW(s). The parameter $L_{MAX}^{CW}$ denotes the maximum number of layers per CW.

In the above embodiments and their variations, instead of signaling and/or configuring the maximum number of CWs $N_{CW,MAX}$ that a UE can transmit within one PUSCH assignment, the maximum total number of layers across the CWs $L_{MAX}$ can be signaled and/or configured. This parameter can be signaled via higher-layer (RRC) signaling or L1/L2 control channel. Optionally, the maximum number of layers for each CW $L_{MAX}^{CW}$ can be signaled and/or configured. Likewise, this parameter can be signaled via higher-layer (RRC) signaling or L1/L2 control channel.

When the maximum total number of layers across the CWs $L_{MAX}$ is signaled and/or configured, example embodiments for UL-related DCI design are as follows. In one example embodiment where one-CW transmission is used for $L \leq 4$ and two-CW transmission is used for $L > 4$, if $L_{MAX} \leq 4$, the DCI includes one MCS field and/or one set of HARQ-related DCI fields wherein the single MCS field and the single HARQ field set correspond to one CW. Else, if $L_{MAX} > 4$, the DCI includes two MCS fields and/or two sets of HARQ-related DCI fields wherein each of the two MCS fields and each of the two HARQ field sets correspond to one of the two CWs. In case of $L_{MAX} > 4$ (the maximum total number of layers configured for the UE) and $L \leq 4$ (the total number of layers assigned for the UE in a particular/scheduled UL assignment), only one of the two MCS field is used to indicate the MCS for the one CW. The second MCS field can be used to signal other hypotheses. In case of $L_{MAX} > 4$ (the maximum total number of layers configured for the UE) and $L > 4$ (the total number of layers assigned for the UE in a particular/scheduled UL assignment), each of the two MCS fields is used to indicate an MCS for one of the two CWs.

Therefore, for a same UL-related DCI format, the number of MCS field depends on the maximum total number of layers per PUSCH assignment per UE.

In the above embodiments and their variations, instead of signaling and/or configuring the maximum number of CWs $N_{CW,MAX}$ or the maximum number of layers across the CWs $L_{MAX}$, the maximum number of MCS fields and/or set(s) of HARQ-related DCI fields in an UL-related DCI can be signaled and/or configured. For example, this maximum number can be configured as either 1 or 2. The maximum number of MCS fields and/or the maximum number of set(s) of HARQ-related DCI fields can be configured either jointly (as one common parameter) or separately.

Instead of the maximum number, the number of MCS fields and/or set(s) of HARQ-related DCI fields in an UL-related DCI can be signaled and/or configured. This parameter can be signaled via higher-layer (RRC) signaling or L1/L2 control channel. For example, this number can be configured as either 1 or 2. The number of MCS fields and/or the maximum number of set(s) of HARQ-related DCI fields can be configured either jointly (as one common parameter) or separately.

When the number (or the maximum number) of MCS fields and/or set(s) of HARQ-related DCI fields in an UL-related DCI is configured as 2 while the assigned number of CWs (or layers) for the UL-related DCI corresponds to one CW, only one of the two MCS field is used to indicate the MCS for the one CW. The second MCS field can be used to signal other hypotheses. When the number (or the maximum number) of MCS fields and/or set(s) of HARQ-related DCI fields in an UL-related DCI is configured as 2 while the assigned number of CWs (or layers) for the DL-related DCI corresponds to two CWs, each of the two MCS fields is used to indicate an MCS for one of the two CWs.

In the above embodiments, two separate parameters for the maximum total number of layers (or maximum number of CWs) can be used for DL and UL, respectively.

For UL, the number or maximum number of MCS fields and/or set(s) of HARQ-related DCI fields can be fixed to one. This is applicable, for example, when the supportable maximum number of layers on the UL corresponds to 1-CW transmission.

The following embodiments for Component 2 pertain to UL and UL signaling supports for the enhancements described in Component 1 when the number of transmission layers L exceeds a certain value and the number of transmitted CWs is 2.

In case of UL signaling for DL reception, a UE signals DL HARQ-ACK and CSI reporting (which includes CQI) per DL component carrier. In case of DL signaling for DL reception, a DL-related DCI (downlink control information) includes at least one MCS (modulation and coding scheme) field and HARQ-related parameter (such as New Data Indicator and/or Redundancy Version) for a PDSCH assignment per UE. If CB-level or CB-group-level HARQ is supported, multiple sets of HARQ-related parameters can be included in the DL-related DCI. In case of DL signaling for UL transmission, an UL-related DCI (downlink control information) includes at least one MCS (modulation and coding scheme) field and HARQ-related parameter (such as New Data Indicator and/or Redundancy Version) for a PUSCH assignment per UE. If CB-level or CB-group-level HARQ is supported, multiple sets of HARQ-related parameters can be included in the DL-related DCI.

When a UE is configured to receive a 1-CW transmission (per PDSCH/PUSCH assignment per UE), for example when $1 \leq L \leq x_1$, several embodiments can be used.

In one embodiment 1A, the UE signals only one DL HARQ-ACK (hence 1 bit) per component carrier. This 1-bit HARQ-ACK is transmitted by the UE via an UL control channel.

In another embodiment 1B, a UE can report CSI which includes only one CQI component per subband (along with RI reporting which takes value from $\{1, 2, \ldots, x_1\}$). For wideband CQI (here the term wideband CQI refers to a single CQI associated with the subbands in the reporting set), only one CQI corresponding to the layers is reported. If the rank indicator (RI) reports L as the number of recommended layers or rank, this single CQI (per subband or for subbands in the reporting set) is calculated assuming transmission across the $L \geq 1$ layers.

In another embodiment 1C, a UE receives a DL-related DCI (downlink control information) which includes only one MCS parameter representing the assigned MCS associated with the single TB or CW. In addition, the DL-related DCI can include one set of HARQ-related parameter (such as New Data Indicator and/or Redundancy Version) associated with the single TB or CW, regardless of the number of layers. If CB-level or CB-group-level HARQ is supported, multiple sets of HARQ-related parameters can be included in the DL-related DCI. This DL-related DCI is received by the UE via a DL control channel.

In one embodiment 1D, a UE receives an UL-related DCI (downlink control information) which includes only one MCS parameter representing the assigned MCS associated with the single TB or CW. In addition, the UL-related DCI can include one set of HARQ-related parameter (such as New Data Indicator and/or Redundancy Version) associated with the single TB or CW, regardless of the number of layers. If CB-level or CB-group-level HARQ is supported, multiple sets of HARQ-related parameters can be included in the UL-related DCI. This UL-related DCI is received by the UE via a DL control channel.

Each of the above embodiments (1A, 1B, 1C, and 1D) can be used by itself or in combination with at least another embodiment when a UE is configured to receive 1-CW transmission per PDSCH/PUSCH assignment.

When a UE is configured to receive a 2-CW transmission (per PDSCH/PUSCH assignment per UE), for example when $L>x_2$, two cases can apply. The first case is when either CW cycling or layer cycling is configured (switched ON). The second case is when none of CW cycling and layer cycling are configured (switched OFF).

In the first case, embodiments 1A, 1B, 1C, and/or 1D can be used. That is, when CW cycling or layer cycling is used, one MCS DCI field, one CQI, one HARQ-related DCI field, and one DL HARQ-ACK feedback can be used even if the number of CWs is 2. This is because each CW is mapped across the layers. Alternatively, when CW cycling or layer cycling is used, one MCS DCI field (associated with both CWs), one CQI (associated with both CWs), two HARQ-related DCI fields (each associated with a CW), and two DL HARQ-ACK feedbacks (each associated with a CW) can be used. Alternatively, when CW cycling or layer cycling is used, two MCS DCI fields (each associated with a CW), two CQIs (each associated with a CW), one HARQ-related DCI field (associated with both CWs), and one DL HARQ-ACK feedback (associated with both CWs) can be used.

In the second case, several embodiments can be used.

In one embodiment 2A, the UE signals two DL HARQ-ACKs (hence 2 bits, each per CW) per component carrier. This 2-bit HARQ-ACK is transmitted by the UE via an UL control channel.

In another embodiment 2B, a UE can report CSI which includes two CQI components per subband (each component representing one CW, along with RI reporting which takes value from $\{x_2+1, x_2+2, \ldots, L_{MAX}\}$). For wideband CQI (here the term wideband CQI refers to two CQIs, each associated a CW with the subbands in the reporting set), two CQIs, each corresponding to a CW with its associated layers, are reported. If the rank indicator (RI) reports L as the number of recommended layers or rank, these two CQIs (per subband or for subbands in the reporting set) are calculated assuming transmission across the $L \geq 1$ layers. The two CQIs can also be encoded differentially relative to a reference or relative to one another.

In another embodiment 2C, a UE receives a DL-related DCI (downlink control information) which includes two MCS parameters representing the assigned MCSs associated with the two TBs or CWs. In addition, the DL-related DCI can include two sets of HARQ-related parameter (such as New Data Indicator and/or Redundancy Version) associated with the two TBs or CWs. If CB-level or CB-group-level HARQ is supported, multiple sets of HARQ-related parameters can be included in the DL-related DCI. This DL-related DCI is received by the UE via a DL control channel.

In one embodiment 2D, a UE receives an UL-related DCI (downlink control information) which includes two MCS parameters representing the assigned MCSs associated with the two TBs or CWs. In addition, the UL-related DCI can include two sets of HARQ-related parameter (such as New Data Indicator and/or Redundancy Version) associated with the two TBs or CWs. If CB-level or CB-group-level HARQ is supported, multiple sets of HARQ-related parameters can be included in the UL-related DCI. This UL-related DCI is received by the UE via a DL control channel.

Each of the above embodiments (2A, 2B, 2C, and 2D) can be used by itself or in combination with at least another embodiment when a UE is configured to receive 2-CW transmission per PDSCH/PUSCH assignment.

Referring to embodiments I and II of component 1, if $x_1=x_2$, the switch between 1-CW and 2-CW transmission can occur dynamically depending on the number of layers L scheduled by the gNB/NW for a UE for a PDSCH/PUSCH assignment. On the other hand, if $x_1>x_2$ (hence for $x_2<L \leq x_1$, either 1-CW or 2-CW transmission can be configured), the switch between 1-CW and 2-CW transmission (when $x_2<L \leq x_1$) can be performed by the gNB/NW for a UE either via higher-layer (e.g. RRC) signaling, via MAC-CE, or via L1 DL control signaling (using DCI).

In a more configurable embodiment, the values of $x_1$ and/or $x_2$ can also be configured by a gNB/NW for a UE. This configuration can be performed via higher-layer (e.g. RRC) signaling.

For embodiment III and its sub-embodiments, to support DL reception in the manners described in TABLE 2, a CSI reporting that includes a recommended correspondence (between the 2 CWs and the L layers) can be used. Since the recommended number of layers is signaled via RI, a CSI reporting parameter that indicates a recommendation for $L_0$ can be added (therefore $L_1$ can be inferred from $L-L_0$). The associated DL-related DCI can include a DCI field which indicates $L_0$ in addition to the DCI field that indicates the number of layers L. Likewise, to support UL reception in the manners described in TABLE 2, the associated UL-related DCI can include a DCI field which indicates $L_0$ in addition to the DCI field that indicates the number of layers L.

Figure 11:
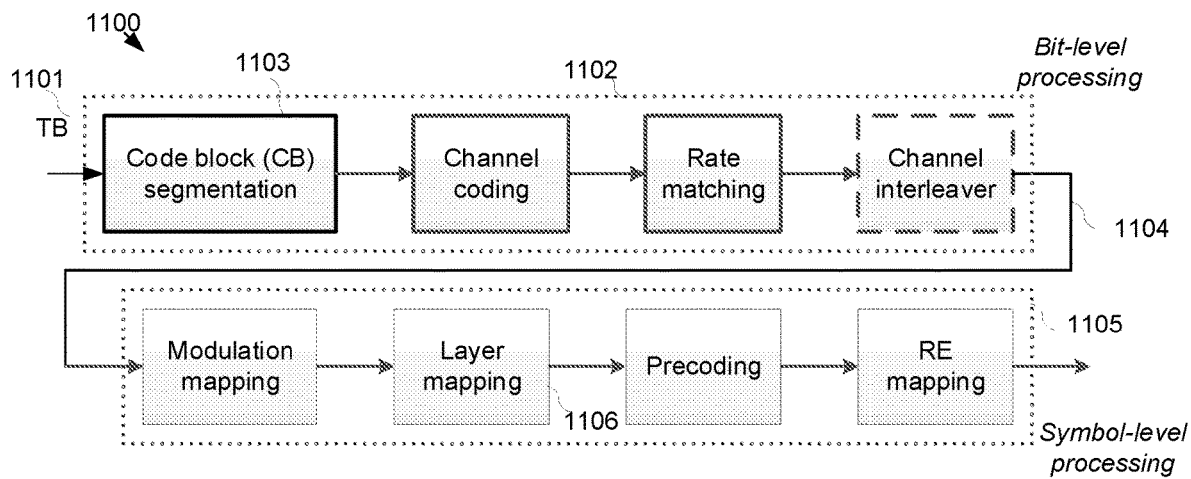
FIG. 11 illustrates an example embodiment for bit- and symbol-level processing according to an embodiment of the present disclosure.
Figure 12:
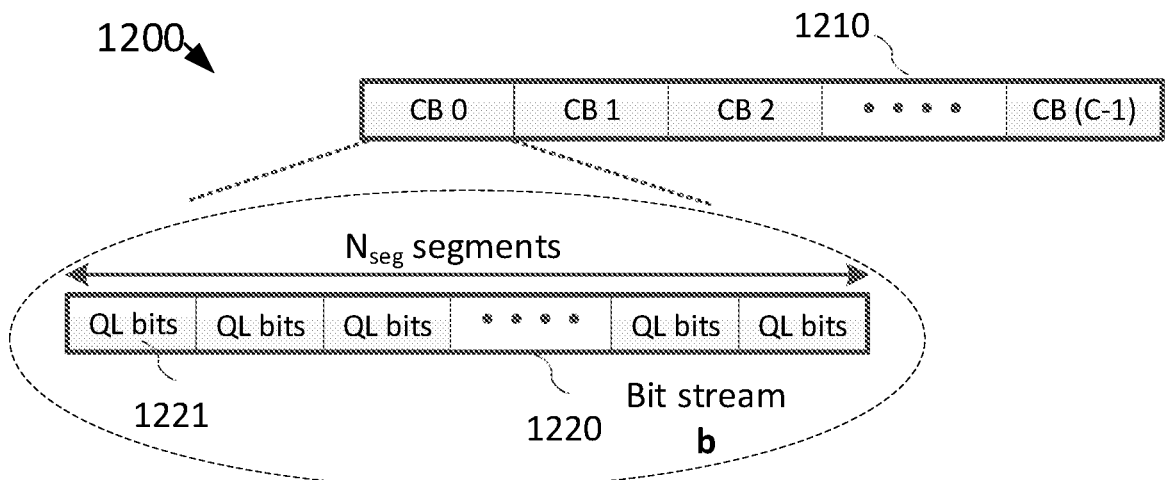
FIG. 12 illustrates an example embodiment for CB segmentation according to an embodiment of the present disclosure.

In LTE, bit- and symbol-level processing can be illustrated in embodiment 1100 of FIG. 11. A transport block (TB) 1101 is processed by the following series of bit-level operations 1102: code block (CB) segmentation (step 1103), channel coding, rate matching, and channel interleaver (only for UL). For CB segmentation, a length-$L_{TB}$ TB is segmented into $C \geq 1$ CBs if $L_{TB}>6144$. If C=1, only a 24-bit TB-CRC is inserted. If C>1, a 24-bit TB-CRC is first added before CB segmentation, followed by the insertion of a 24-bit CB-CRC at the end of each CB. Therefore, for C>1, both TB-CRC and CB-CRC are inserted. Note that TB-CRC and CB-CRC have different generating polynomials. To minimize the number of filler bits, up to two values of CB length $K_+$ and $K_-$ are used. Therefore, in most cases when C>1, some CBs can be of length-$K_-$ while the others of length-$K_+$. For channel coding, a set of allowable CB lengths (defined for Turbo QPP interleaver) are used with rate-1/3 Turbo code (PCCC) with 8-state constituent encoders. Since Turbo code is based on convolutional code, it does not have a built-in error detection capability. For rate matching, equal interleaving & puncturing for each of 3 Turbo output streams. This is achieved using 3 identical rectangular sub-block interleavers (one interleaver per Turbo output stream), bit collection followed by bit selection/pruning via circular buffer, and CB concatenation to form codeword (CW). The output of bit-level processing 1104, associated with one TB and one CW, is then processed by the following series of symbol-level operations 1105: modulation mapping, layer mapping (1106), precoding, and RE mapping.

For 5G NR, at least three aspects of bit- and symbol-level processing can be different from LTE. First, with low-density parity check (LDPC) code for data transmission (and potentially polar code for control transmission), the employed channel coding scheme possesses an inherent ("free") error detection capability per CB. This is especially true with LDPC code since syndrome decoding (inherent property of block codes) can be used. However, the error detection performance associated with syndrome decoding can be dependent on the CB size. This can impact the design of CB segmentation (especially CRC insertion). Second, LDPC code may have different output stream properties from Turbo code (for example: with a 3-stream design, the first and second parity output streams for LDPC are directly related to each other). This impacts the design of rate matching as it needs to ensure proper puncturing. Third, a more efficient layer mapping scheme can be employed. Although beneficial for facilitating modulation-and-coding-scheme (MCS) adaptation per codeword (CW) and MMSE-SIC (MMSE with successive interference cancellation) receiver, it costs some significant overhead over a single CW mapping. DL overhead comes from the additional DCI payload due to 2 fixed MCS fields and 2 fixed NDI-RV (DL HARQ related) fields. UL overhead comes from the need for two CQIs (full 4-bit+delta 3-bit for wideband CQI, and 2× overhead for subband CQI) for rank>1 and two DL HARQ-ACKs for rank>1. Added to that is the complexity of having to accommodate more than one layer mapping schemes in case of retransmission. Therefore, an improved scheme with a single CW per UE for both DL and UL can be beneficial. This will impact CB segmentation (especially CB formation and filler bits) and, potentially, rate matching.

Considering the above new challenges for 5G NR systems, there is a need for designing a new bit- and symbol-level processing, in particular, CB segmentation and rate matching.

The present disclosure includes the following components. A third component pertains to CRC insertion for CB segmentation. A fourth component includes CB formation for CB segmentation. A fifth component includes a solution for CB concatenation. Each of the components can be used either by itself (without the other component) or in conjunction with at least one of the other component. Likewise, each of the components includes a plurality of sub-components. Each of the sub-components can be used either by itself (without any other sub-component) or in conjunction with at least one of the other sub-components.

Each of these components (including the components described previously) can be used either by itself (without the other component) or in conjunction with at least one of the other component. Likewise, each of these components includes a plurality of sub-components. Each of the sub-components can be used either by itself (without any other sub-component) or in conjunction with at least one of the other sub-components.

For the third component (that is, CRC insertion for CB segmentation), a codeword (CW) originates from a transport block (TB). A TB, depending on its size, can be segmented into one or multiple code blocks (CBs) for the purpose of limiting channel decoding latency at the UE. For instance, one CB can be decoded and facilitate early detection of TB decoding failure (hence enabling fast CB-level HARQ). Embodiment 1100 of FIG. 11 illustrates the process of CB segmentation wherein a TB 1101 is partitioned into multiple CBs (with the special case of one CB when the TB size is small) 1102. Given the number of layers L, the selected MCS, resource allocation, and possibly some other transmission parameters, CB segmentation 1110 can include at least one of the following functions: segmentation of TB into one or more CBs, padding (to ensure a certain CB size before channel coding), introduction of CRC bits per CB (termed CB-CRC in the present disclosure). In addition, TB-CRC bits can be added either at 1101 (prior to segmentation, just as in LTE) or at 1102 (after segmentation and/or insertion of CB-CRC(s)).

Several embodiments are described as follows. In the following descriptions, the length/size of CRC, CB, and TB are defined in terms of the number of bits.

In one embodiment, CB-CRC is inserted for each CB of the C≥1 CBs. When C=1, CB-CRC is functionally equivalent to TB-CRC. In this embodiment, the length of CB-CRC can be chosen from a set of multiple (M>1) values, that is, $N_{CB-CRC} \in \{N_0, N_1, \ldots, N_{M-1}\}$ where $N_i < N_{i+1}$ (i=0, 1, ..., M−1). This variable-length CB-CRC can be used either only for data transmission (UL and DL) or for data as well as control transmissions (UL and/or DL). This embodiment is motivated by the fact that LDPC possesses an inherent error detection capability which can be used in conjunction with CB-CRC. Therefore, the maximum length of $N_{CB-CRC}$ (in this case $N_{M-1}$) can be chosen by taking this into account. For example, since LTE uses a 24-bit CB-CRC, $N_{CB-CRC}$ can be further reduced. In addition, the error detection performance (measured in terms of false pass rate and/or false alarm rate) is dependent on the CB length. In particular, the error detection performance from syndrome decoding improves as CB size increases. For example, for CB size of 117, a false pass rate of $<2^{-7}$ (which is comparable to a 7-bit CRC) can be attained with syndrome decoding of LDPC code. For CB size of 1000, a false pass rate of $<2^{-10}$ (which is comparable to a 10-bit CRC) can be attained with syndrome decoding of LDPC code.

In the following descriptions, the CB size $N_{CB}$ can be defined including CB-CRC or without (before the insertion of) CB-CRC.

In one sub-embodiment, the length of CB-CRC for data transmission can be configured via higher-layer (RRC) signaling for each UE. An RRC parameter is then used to indicate $N_{CB-CRC}$ Alternatively, the length of CB-CRC for data transmission can be dynamically configured via MAC control element (MAC CE) or L1 DL control signaling.

In another sub-embodiment, the length of CB-CRC for data transmission can be made dependent on the CB size $N_{CB}$. For example, with M possible values $N_{CB-CRC} \in \{N_0, N_1, \ldots, N_{M-1}\}$, the following rule can be used.

$$N_{CB-CRC} = \begin{cases} N_0, & N_{CB} \le K_0 \\ N_1, & K_0 < N_{CB} \le K_1 \\ \vdots & \vdots \\ N_{M-1}, & K_{M-2} < N_{CB} \le K_{M-1} \end{cases} \quad \text{(Equation 16)}$$

The threshold values of CB size $\{K_0, K_1, \ldots, K_{M-1}\}$ where $K_i < K_{i+1}$ (i=0, 1, ..., M−1) are used to define ranges for different $N_{CB-CRC}$ values. The value of M, the set of values for $\{K_0, K_1, \ldots, K_{M-1}\}$, and/or the set of values for $N_{CB-CRC} \in \{N_0, N_1, \ldots, N_{M-1}\}$ can either be configurable (e.g. via higher-layer/RRC signaling or MAC CE or L1 DL control) or fixed in the specification(s).

From UE perspective, the CB size can be inferred from the DCI field (in the DL assignment or UL grant) that includes either an MCS index and/or a TB size $N_{TB}$. The TB size $N_{TB}$ can be inferred from the MCS index as well as resource (PRB) allocation. From the TB size $N_{TB}$, the number of CBs C and the CB size $N_{CB}$ can be inferred from CB segmentation (cf. Component 2 in the present disclosure).

In one example of the above sub-embodiment, M is 2 and $\{N_0, N_1\}=\{16,24\}$. In another example, M is 2 and $\{N_0, N_1\}=\{16,20\}$. In another example, M is 2 and $\{N_0, N_1\}=\{12,20\}$. In another example, M is 2 and $\{N_0, N_1\}=\{8, 16\}$. In another example, M is 3 and $\{N_0, N_1, N_2\}=\{16,20, 24\}$. In another example, M is 3 and $\{N_0, N_1, N_2\}=\{12,16, 20\}$. In another example, M is 3 and $\{N_0, N_1, N_2\}=\{8,12, 16\}$. In another example, M is 4 and $\{N_0, N_1, N_2, N_3\}=\{12, 16,20,24\}$. In another example, M is 4 and $\{N_0, N_1, N_2, N_3\}=\{8,12,16,20\}$.

In a variation of the previous sub-embodiment, the length of CB-CRC $N_{CB-CRC} \in \{N_0, N_1, \ldots, N_{M-1}\}$ can also be made dependent not only on the CB size $N_{CB}$, but also the modulation and coding rate. From UE perspective, as described above, the CB size can be inferred from the DCI field (in the DL assignment or UL grant) that includes either an MCS index and/or a TB size $N_{TB}$. The TB size $N_{TB}$ can be inferred from the MCS index as well as resource (PRB) allocation. From the TB size $N_{TB}$, the number of CBs C and the CB size $N_{CB}$ can be inferred from CB segmentation (cf. Component 2 in the present disclosure). The modulation and coding rate can be inferred from the MCS index and/or resource (PRB) allocation.

As mentioned above, when C=1, CB-CRC is functionally equivalent to TB-CRC. In another embodiment, in addition to inserting CB-CRC(s) as described in the previous embodiment, a TB-CRC is also inserted prior to CB segmentation when the number of CBs associated with the TB C is greater than a threshold value $C_{min}$ ($C > C_{min}$). Else (when $C \le C_{min}$), only CB-CRC(s) are inserted (one CB-CRC per CB). The rationale of this embodiment is to offer more protection when the number of CBs is sufficiently large (which implies larger TB size). The value of $C_{min}$ can either be configurable (e.g. via higher-layer/RRC signaling or MAC CE or L1 DL control) or fixed in the specification(s).

A CB-group is defined as a plurality of $C_{GROUP}$ CBs (regardless whether the CBs are consecutive/sequential or not) within one TB. When a CB-group includes the C CBs associated with one TB, a CBG-CRC is essentially a TB-CRC. In another embodiment, in addition to inserting CB-CRC(s) as described in the previous embodiment, a CB-group-CRC (CBG-CRC) is also inserted prior to CB segmentation when the number of CBs in a CB-group $C_{GROUP}$ is greater than a threshold value $C_{GROUP,min}$ ($C_{GROUP} > C_{GROUP,min}$) Else (when $C_{GROUP} \le C_{GROUP,min}$), only CB-CRC(s) are inserted (one CB-CRC per CB). The value of $C_{GROUP,min}$ can either be configurable (e.g. via higher-layer/RRC signaling or MAC CE or L1 DL control) or fixed in the specification(s). CBG-CRC can be used with or without TB-CRC.

For the fourth component (that is, CB formation for CB segmentation), two types of CW-to-layer mapping (or layer mapping) schemes are considered for single-CW: symbol-level and CB-level layer mapping. Using vertical mapping with frequency-first (rather than time-first) as an example, symbol-level and CB-level layer mapping can be described as follows. Extensions to horizontal or diagonal mapping as well as time-first mapping, are straightforward to those skilled in the art. Likewise, both symbol- and CB-level vertical mappings can both be used for different conditions (e.g. dependent on the number of CBs C, and/or the number of layers L).

Several embodiments of CB segmentation for symbol- and CB-level layer mapping are described as follows. In the following embodiments, the CB size $N_{CB}$ (bits) is defined including CB-CRC. Extensions for the case without (before the insertion of) CB-CRC are straightforward to those skilled in the art. Likewise, the TB size $N_{TB}$ (bits) is defined including TB-CRC. Extensions for the case without (before the insertion of) TB-CRC are straightforward for those skilled in the art. Any of the embodiments below is applicable for designs with or without TB-CRC (inserted prior to CB segmentation), as well as with or without CBG-CRC (inserted prior to CB segmentation). In the following descriptions, the length/size of CRC, CB, and TB are defined in terms of the number of bits.

In one embodiment I (especially suitable for symbol-level mapping, although also applicable for CB-level mapping), a same CB size $N_{CB}$ (bits) is used for the C CBs {CB 0, CB 1, ..., CB C−1} associated with a same TB. Denoting the maximum CB size as $N_{CB,MAX}$, the number of CBs C associated with a length-$N_{TB}$ TB can be calculated as follows. If $N_{TB} \leq N_{CB,MAX}$, then C=1. The CB size $N_{CB}$ can be set as the minimum supported CB size $\tilde{N}_{CB}$ for the channel coding (e.g. LDPC for data transmission) such that $\tilde{N}_{CB} \geq N_{TB}$. Else, if $N_{TB} > N_{CB,MAX}$, define $$C_+ = \left\lceil \frac{N_{TB}}{N_{CB,MAX} - N_{CB-CRC}} \right\rceil$$

and $C_- = C_+ - 1$. Also define $K_+$ as the minimum supported CB size $\tilde{N}_{CB}$ for the channel coding (e.g. LDPC for data transmission) such that $C_+ \times (\tilde{N}_{CB} - N_{CB-CRC}) \geq N_{TB}$. Then C can be determined as described in equation (17). The CB size $N_{CB}$ can be set as $N_{CB} = K_+$.

$$C = \begin{cases} C_-, & C_- \times (K_+ - N_{CB-CRC}) \geq N_{TB} \\ C_+, & C_- \times (K_+ - N_{CB-CRC}) < N_{TB} \end{cases} \quad \text{(Equation 17)}$$

The value of $N_{CB,MAX}$ can either be configurable (e.g. via higher-layer/RRC signaling or MAC CE or L1 DL control) or fixed in the specification(s). The value of $N_{CB,MAX}$ can be one of the supported CB sizes for the channel coding (e.g. LDPC for data transmission).

The number of filler bits can be calculated from equation (18). The filler bits can be set to <NULL> (assumed to have the value 0 for CRC calculation) and inserted in a predetermined location (either localized such as at the beginning of the TB, or distributed/scattered throughout the TB).

$$N_{FILLER} = C \times N_{CB} - N_{TB} \quad \text{(Equation 18)}$$

In another embodiment II (especially suitable for CB-level mapping, although also applicable for symbol-level mapping), a same CB size $N_{CB}$ is used for the C CBs {CB 0, CB 1, ..., CB C−1} associated with a same TB. But the number of transmission layers L is also used to determine the number of CBs in a TB C as well as the CB size $N_{CB}$. In particular, the total number of CBs C is chosen to be an integer multiple of L. That is, C=μL where μ is at least 1. Denoting the maximum CB size as $N_{CB,MAX}$, the number of CBs C (=μL) associated with a length-$N_{TB}$ TB can be calculated as follows. If L=1 and $N_{TB} \leq N_{CB,MAX}$, then C=1. The CB size $N_{CB}$ can be set as the minimum supported CB size $\tilde{N}_{CB}$ for the channel coding (e.g. LDPC for data transmission) such that $\tilde{N}_{CB} \geq N_{TB}$. Else, define $$C_+ = L \times \left\lceil \frac{N_{TB}}{(N_{CB,MAX} - N_{CB-CRC}) \times L} \right\rceil$$

and $C_- = C_+ - L$. Also define $K_+$ as the minimum supported CB size $\tilde{N}_{CB}$ for the channel coding (e.g. LDPC for data transmission) such that $C_+ \times (\tilde{N}_{CB} - N_{CB-CRC}) \geq N_{TB}$. Then C can be determined as described in equation (19). The CB size $N_{CB}$ can be set as $N_{CB} = K_+$.

$$C = \begin{cases} C_-, & C_- \times (K_+ - N_{CB-CRC}) \geq N_{TB} \\ C_+, & C_- \times (K_+ - N_{CB-CRC}) < N_{TB} \end{cases} \quad \text{(Equation 19)}$$

The value of $N_{CB,MAX}$ can either be configurable (e.g. via higher-layer/RRC signaling or MAC CE or L1 DL control) or fixed in the specification(s). The value of $N_{CB,MAX}$ can be one of the supported CB sizes for the channel coding (e.g. LDPC for data transmission).

The number of filler bits can be calculated from equation (20). The filler bits can be set to <NULL> (assumed to have the value 0 for CRC calculation) and inserted in a predetermined location (either localized such as at the beginning of the TB, or distributed/scattered throughout the TB).

$$N_{FILLER} = C \times N_{CB} - N_{TB} \quad \text{(Equation 20)}$$

In another embodiment III (especially suitable for CB-level mapping, although also applicable for symbol-level mapping), whenever applicable, two CB sizes $N_{CB,-}$ and $N_{CB,+}$ are used for the first $C_-$ CBs and the next $C_+$ CBs from a same TB, respectively. The number of transmission layers L is also used to determine the number of CBs as well as the CB sizes. Denoting the maximum CB size as $N_{CB,MAX}$, the number of CBs and CB sizes can be calculated as follows. If L=1 and $N_{TB} \leq N_{CB,MAX}$, then $C_+ = 1$ and $C_- = 0$. The CB size $N_{CB}$ can be set as the minimum supported CB size $N_{CB}$ for the channel coding (e.g. LDPC for data transmission) such that $\tilde{N}_{CB} \geq N_{TB}$. Else, define $$C_{TOT} = L \times \left\lceil \frac{N_{TB}}{(N_{CB,MAX} - N_{CB-CRC}) \times L} \right\rceil,$$

$K_+$ as the minimum supported CB size $\tilde{N}_{CB}$ for the channel coding (e.g. LDPC for data transmission) such that $C_{TOT} \times (\tilde{N}_{CB} - N_{CB-CRC}) \geq N_{TB}$, $K_-$ as the maximum supported CB size $\tilde{N}_{CB}$ for the channel coding (e.g. LDPC for data transmission) such that $\tilde{N}_{CB} < K_+$. Then the number of CBs and CB sizes can be calculated in equation (21).

$$C_- = \left\lfloor \frac{C_{TOT} \times (K_+ - N_{CB-CRC}) - N_{TB}}{K_+ - K_-} \right\rfloor, N_{CB,-} = K_- \quad \text{(Equation 21)}$$
$$C_+ = C_{TOT} - C_-, N_{CB,+} = K_+$$

The value of $N_{CB,MAX}$ can either be configurable (e.g. via higher-layer/RRC signaling or MAC CE or L1 DL control) or fixed in the specification(s). The value of $N_{CB,MAX}$ can be one of the supported CB sizes for the channel coding (e.g. LDPC for data transmission).

The number of filler bits can be calculated from equation (22). The filler bits can be set to <NULL> (assumed to have the value 0 for CRC calculation) and inserted in a predetermined location (either localized such as at the beginning of the TB, or distributed/scattered throughout the TB).

$$N_{FILLER} = C_- \times N_{CB,-} + C_+ \times N_{CB,+} - N_{TB} \quad \text{(Equation 22)}$$

In a variation of embodiment III (III-B), equation (21) can be replaced by equation (23) while other components strictly follow the description of embodiment III. Equation (23) guarantees that {CB n, CB n+1, ..., CB n+L−1} share the same CB size $B_n$ (symbols) at least for a given value of n. For different values of n, however, CB sizes can vary.

$$C_- = L \times \left\lfloor \frac{C_{TOT} \times (K_+ - N_{CB-CRC}) - N_{TB}}{(K_+ - K_-) \times L} \right\rfloor, N_{CB,-} = K_- \quad \text{(Equation 23)}$$

$$C_+ = C_{TOT} - C_-, N_{CB,+} = K_+$$

For the fifth component (that is, CB concatenation), after each of the CBs is rate matched, the CBs from the same TB are concatenated to form a codeword (CW)—which is later mapped to a sequence of QAM symbols. In LTE, a simple concatenation scheme where the CBs are stacked into one sequence is adopted. For NR, transmission bandwidth is expected to be significantly larger for NR especially for >6 GHz scenario. In this case, when a large TB including many CBs is mapped onto an allocated resource (RBs), it is beneficial to ensure that the QAM symbols (hence the bit sequence) from each CB are mapped across the allocated transmission bandwidth. By doing this, each CB may experience more or less similar frequency-selective channel which reduces the risk of losing a few of CBs due to deep channel fades.

Therefore, a bit or symbol-level interleaver can be added into the CB concatenation operation (either before or after stacking the CBs from the same TB) so that the bits or symbols from each CB can be spread across the allocated transmission bandwidth (rather than, e.g. localized within a confined set of RBs in frequency domain).

The interleaver can be designed with two primary criteria: 1) When mapped onto the allocated RBs within a slot/subframe, a CB should occupy minimum number of OFDM symbols. This is to ensure minimum CB decoding latency. 2) When mapped onto the allocated RBs within a slot/subframe, a CB should be spread across the allocated PRBs as much as possible. Therefore, a CB should be mapped as narrowly as possible in time domain but as widely as possible in frequency domain.

Some example embodiments on CB concatenation scheme are given as follows.

Denote the number of bits per CB after rate matching and the number of CBs within one TB/CW as $S_{CB,bit}$ (assuming that the CBs are of the same length) and C, respectively, define the number of segments per CB $N_{seg}$ as the number of bits per CB divided by the modulation order (Q=the number of bits per modulation symbol, i.e. 2 for QPSK, 4 for 16QAM, 6 for 64QAM, 8 for 256QAM) and the number of layers L for the TB/CW:

$$N_{seg} = \frac{S_{CB,bit}}{QL} \quad \text{(Equation 24)}$$

The number of segments per CB represents the number of modulation symbols per for each layer per CB. It can be assumed that CB segmentation and/or rate matching ensures that $S_{CB,bit}$ is an integer multiple of QL. This is illustrated in diagram 1200 of FIG. 12 wherein a TB 1210 includes of C CBs. The first CB (CB 0, 1220) is segmented into $N_{seg}$ parts where each part is composed of QL bits (such as part 1221). Furthermore, denote the number of OFDM symbols per slot/subframe and the number of REs/sub-carriers associated with the allocated RBs (per OFDM symbol) as $M_{OFDM}$ and $M_{RE}$, respectively. For example, for a an NR slot including 14 OFDM symbols with 4 allocated RBs (each RB having 12 REs/subcarriers), $M_{OFDM}$=14 and $M_{RE}$=48. In addition, define the following parameters:

$$\mu = \left\lfloor \frac{M_{RE}}{N_{seg}} \right\rfloor, \alpha = \left\lceil \frac{M_{RE}}{N_{seg}} \right\rceil \quad \text{(Equation 25)}$$

If $\mu$=0, one CB occupies more than one OFDM symbol even if the REs/sub-carriers in the allocated RBs are used. Conversely, if $\mu \geq 0$, one CB can occupy at least one OFDM symbol.

For the following example embodiments, it is assumed that the C CBs from one TB/CW are of the same size. Extension to the case where two CB sizes are used (such as in LTE) can be inferred by those familiar with the art. In one example, if two CB sizes are used (such as in LTE), the parameters in equations (24) and (25) ($N_{seg}$, $\mu$, and $\alpha$) can be calculated based on the smaller CB size ($S_{CB,bit}^-$). In another example, if two CB sizes are used (such as in LTE), the parameters in equations (24) and (25) ($N_{seg}$, $\mu$, and $\alpha$) can be calculated based on the larger CB size ($S_{CB,bit}^+$).

In one embodiment (I), the CB concatenation can be performed as follows. When $\mu \leq x$ (where x is an integer), a CB concatenation scheme termed Scheme A in the present disclosure is used. Scheme A can be described as follows. All the C CBs associated with one TB/CW are stacked together without any interleaving operation as illustrated in 1210 of FIG. 12. When $\mu > x$ (where x is an integer), a CB concatenation scheme termed Scheme B in the present disclosure is used. Scheme B can be described as follows. Denote a set of indices associated with the c-th CB (c=0, 1, . . . , C−1) as $$\{\sigma_{c,0}, \sigma_{c,1}, \ldots, \sigma_{c,N_{seg}-2}, \sigma_{c,N_{seg}-1}\}$$

where $\sigma_{c,s}$ corresponds to the c-th CB and the s-th segment (s=0, 1, . . . , $N_{seg}$−1). Define a length-$N_{seg}$ row vector with elements of $$\{\sigma_{c,0}, \sigma_{c,1}, \ldots, \sigma_{c,N_{seg}-2}, \sigma_{c,N_{seg}-1}\}$$

as $\sigma_c$ and an $$\alpha\text{-by-}\left(\left\lfloor \frac{C}{\alpha} \right\rfloor N_{seg}\right)$$

matrix $\Sigma$ as follows:

$$\Sigma = \begin{bmatrix} \sigma_0 & \sigma_\alpha & \cdots & \sigma_{(\lfloor C/\alpha \rfloor -1)\alpha} \\ \sigma_1 & \sigma_{\alpha+1} & \cdots & \sigma_{(\lfloor C/\alpha \rfloor -1)\alpha+1} \\ \vdots & \vdots & \ddots & \vdots \\ \sigma_{\alpha-1} & \sigma_{2\alpha-1} & \cdots & \sigma_{(\lfloor C/\alpha \rfloor)\alpha-1} \end{bmatrix} \quad \text{(Equation 26)}$$

Note that when mod(C, α)=z≠0, the vectors $$\sigma_{(\lfloor \frac{C}{\alpha} \rfloor-1)\alpha+k},$$

k=z, z+1, . . . , α−1 are composed of filler bits, each having value of <NULL>. Then an interleaver π, described as a length-($CN_{seg}$) row vector, composed of the indices of matrix Σ, read in a "row-first then column" manner can be described as follows. The vec(X) operation stacks the elements of matrix X in a row-first manner (followed by across columns) to create a column vector.

(Equation 27)
$$\pi = [vec(\Sigma)]^T$$
$$= \begin{bmatrix} \sigma_{0,0}, \sigma_{1,0}, \ldots, \sigma_{\alpha-1,0}, \sigma_{0,1}, \sigma_{1,1}, \ldots, \sigma_{\alpha-1,1}, \ldots, \\ \sigma_{0,N_{seg}-1}, \sigma_{1,N_{seg}-1}, \ldots, \sigma_{\alpha-1,N_{seg}-1}, \ldots, \sigma_{(\lfloor \frac{C}{\alpha} \rfloor)\alpha-1,N_{seg}-1} \end{bmatrix}$$

After the operation in equation (27), the filler (<NULL> valued) bits at the end can be removed.

As evident from equation (27), interleaver π introduces a separation of (α−1) symbols between two consecutive modulation symbols in a CB. Since a is determined according to equation (26), the interleaver allows each CB to effectively span the entire allocated RBs (to maximize frequency diversity) using the minimum possible number of OFDM symbols.

The above interleaver π operates at bit-level yet interleaves each of the QL streams in the same manner. This is illustrated in diagram 1300 of FIG. 13. Referring to the segmentation operation in FIG. 12 (where each segment, such as 1221, is composed of QL bits representing a bit within a modulation symbol per layer), each of the QL bit streams (with each stream including $N_{seg}$ bits, cf. 1210 and 1220 in FIG. 12) is interleaved with the same interleaver π 1310 described in equation (27). After applying QL parallel interleaving operations, the QL bit streams are collected into one stream analogous to 1210 and 1220 of FIG. 12.

Figure 13:
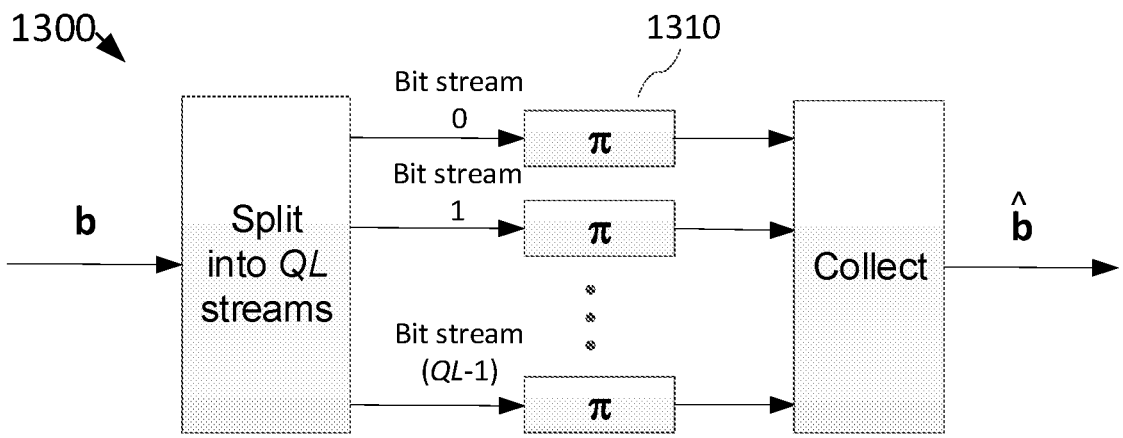
FIG. 13 illustrates an example embodiment for bit-level interleaver operating according to an embodiment of the present disclosure.

The sequence of operation in FIG. 13 can be described as follows. Denote the n-th bit associated with the c-th CB as $b_{c,n}$. The bit stream associated with a TB/CW including C CBs can be described as follows after CB concatenation:

(Equation 28)
$$b = \begin{Bmatrix} b_{0,0}, b_{0,1}, \ldots, b_{0,S_{CB,bit}-1}, b_{1,0}, b_{1,1}, \ldots, b_{1,S_{CB,bit}-1}, \ldots, \\ b_{C-1,0}, b_{C-1,1}, \ldots, b_{C-1,S_{CB,bit}-1} \end{Bmatrix}$$

This bit stream can then be rearranged into QL streams as follows (equation (15)). The i-th row of matrix B (denoted as $\beta_i$ in equation (29)) corresponds to the i-th bit stream in FIG. 13 (i=0, 1, . . . , QL−1).

(Equation 29)
$$B = \begin{bmatrix} b_{0,0} & b_{0,QL} & \ldots & b_{0,(N_{seg}-1)QL} & \ldots & b_{C-1,0} & b_{C-1,QL} & \ldots & b_{C-1,(N_{seg}-1)QL} \\ b_{0,1} & b_{0,QL+1} & \ldots & b_{0,(N_{seg}-1)QL+1} & \ldots & b_{C-1,1} & b_{C-1,QL+1} & \ldots & b_{C-1,(N_{seg}-1)QL+1} \\ \vdots & \vdots & \ddots & \vdots & & \vdots & \vdots & \ddots & \vdots \\ b_{0,QL-1} & b_{0,2QL-1} & \ldots & b_{0,S_{CB,bit}-1} & \ldots & b_{C-1,QL-1} & b_{C-1,2QL-1} & \ldots & b_{C-1,S_{CB,bit}-1} \end{bmatrix}$$
$$= \begin{bmatrix} \beta_0 \\ \beta_1 \\ \vdots \\ \beta_{QL-1} \end{bmatrix}$$

After each bit stream is interleaved (resulting in interleaved bit stream $\beta_i(\pi)$), the bit collection operation can be described as follows:

(Equation 30)
$$\hat{b} = \begin{bmatrix} vec \begin{pmatrix} \begin{bmatrix} \beta_0(\pi) \\ \beta_1(\pi) \\ \vdots \\ \beta_{QL-1}(\pi) \end{bmatrix} \end{pmatrix} \end{bmatrix}^T$$

In a variation of the above example embodiment, the interleaving operation in Scheme B (including equations (26), (27), (28), (29), and (30)) can also be implemented as a block or rectangular bit-interleaver. For example, Σ in equation (26) describes the block interleaving operation wherein the i-th bit stream $\beta_i$ is written (e.g. into a memory or a bank of shift registers) column-wise (column-first) then read (e.g. from the memory or the bank of shift registers) row-wise (row-first) according to the arrangement in (26). The number of rows and columns in the block interleaver are determined by the number of CBs, CB size, and the number of allocated RBs. Alternatively, the block or rectangular interleaver Σ in equation (26) can be implemented as a bit-group interleaver wherein the interleaver operates in a group of QL bits (instead of 1 bit). In this case, the bit stream b, grouped into units of QL bits, is written (e.g. into a memory or a bank of shift registers) column-wise (column-first) then read (e.g. from the memory or the bank of shift registers) row-wise (row-first) according to the arrangement in (26).

To illustrate the operation of Scheme B, in an example, the value of α, C, and $N_{seg}$ are assumed to be 2, 4, and 3, respectively. In this example, therefore, the interleaver is given as follows.

$\pi = [\sigma_{0,0}, \sigma_{1,0}, \sigma_{0,1}, \sigma_{1,1}, \sigma_{0,2}, \sigma_{1,2}, \sigma_{2,0}, \sigma_{3,0}, \sigma_{2,1}, \sigma_{3,1}, \sigma_{2,2},$
$\sigma_{3,2}]$ (Equation 31)

With the length-$CN_{seg}$ input stream
$\beta_i = \{\beta_{i,0,0}, \beta_{i,0,1}, \beta_{i,0,2}, \beta_{i,1,0}, \beta_{i,1,1}, \beta_{i,1,2}, \beta_{i,2,0}, \beta_{i,2,1}, \beta_{i,2,2}, \beta_{i,3,0}, \beta_{i,3,1}, \beta_{i,3,2}\}$, the resulting bit stream after interleaving is
$\beta_i(\pi) = \{\beta_{i,0,0}, \beta_{i,1,0}, \beta_{i,0,1}, \beta_{i,1,1}, \beta_{i,0,2}, \beta_{i,1,2}, \beta_{i,2,0}, \beta_{i,3,0}, \beta_{i,2,1}, \beta_{i,3,2}, \beta_{i,2,2}, \beta_{i,3,2}\}$.

In a sub-embodiment of this embodiment, the value of x is set to 0. In another sub-embodiment, the value of x is set to 1. In yet another sub-embodiment, the value of x is configurable for each UE either semi-statically (via higher-layer signaling) or dynamically (via L1 or L2 control signaling).

In another embodiment (II), the CB concatenation can be performed as follows. The condition for using Scheme A and Scheme is based on the channel bandwidth (e.g. system bandwidth) either associated with the cell/TRP/gNB or associated with a UE. For example, if the channel bandwidth (or system bandwidth) is less than or equal to a certain value (such as 20 MHz), Scheme A is used. Else, if the channel bandwidth (or system bandwidth) is greater than a certain value (such as 20 MHz), embodiment I is used (that is, Scheme B can be used if the number of allocated RBs is large enough relative to the CB size $N_{seg}$).

In another embodiment (III), the CB concatenation can be performed as follows. The condition for using Scheme A and Scheme is based on resource allocation (RA) signaled in the DL- or UL-related DCI (associated with DL or UL assignment, respectively). For example, if the frequency span of the RA (the difference between the highest RE/sub-carrier index and the lowest RE/sub-carrier index) is equivalent to a value less than or equal to a certain value (such as 20 MHz), Scheme A is used. Otherwise, embodiment I is used (that is, Scheme B can be used if the number of allocated RBs is large enough relative to the CB size $N_{seg}$).

In the above embodiments and sub-embodiments (I, II, and III), the bit stream b is divided into QL streams where each of the QL streams is interleaved with the same length-$CN_{seg}$ interleaver $\pi$. Therefore, the number of segments per CB is $$N_{seg} = \frac{S_{CB,bit}}{QL}.$$

In a variation of these embodiments, the bit stream b is divided into Q streams where each of the Q streams is interleaved with the same length-$CN'_{seg}$ interleaver $\pi'$ where $$N'_{seg} = \frac{S_{CB,bit}}{Q}.$$

Therefore, $$\mu' = \left\lfloor \frac{M_{RE}}{N'_{seg}} \right\rfloor,$$

$$\alpha' = \left\lceil \frac{M_{RE}}{N'_{seg}} \right\rceil.$$

In yet another variation of these embodiments, the bit stream b is divided into L streams where each of the L streams is interleaved with the same length-$CN''_{seg}$ interleaver $\pi''$ where $$N''_{seg} = \frac{S_{CB,bit}}{L}.$$

Therefore, $$\mu'' = \left\lfloor \frac{M_{RE}}{N''_{seg}} \right\rfloor,$$

$$\alpha'' = \left\lceil \frac{M_{RE}}{N''_{seg}} \right\rceil.$$

In yet another variation of these embodiments, the bit stream b is not divided into streams and is interleaved with length-$CS_{CB,bit}$ interleaver $\pi'''$ where $$\mu''' = \left\lfloor \frac{M_{RE}}{S_{CB,bit}} \right\rfloor,$$

$$\alpha''' = \left\lceil \frac{M_{RE}}{S_{CB,bit}} \right\rceil.$$

Figure 14:
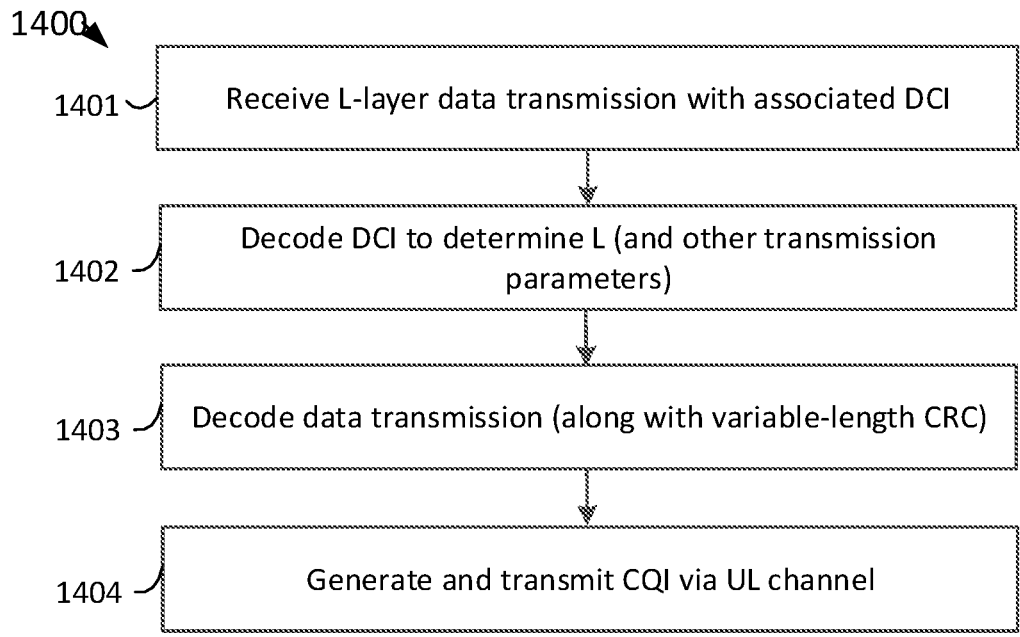
FIG. 14 illustrates a flowchart for an example method wherein a UE receives a multi-layer data transmission according to an embodiment of the present disclosure.

FIG. 14 illustrates a flowchart for an example method 1400 wherein a UE receives a multi-layer data transmission according to an embodiment of the present disclosure. For example, the method 1400 can be performed by the UE 116.

The method 1400 begins with the UE receiving an L-layer data transmission, wherein the data transmission is composed of at least one codeblock (CB) and the CB includes a length-N cyclic redundancy code (CRC). The length of the CRC N is a function of the length of the CB and the length corresponds to a number of bits. In addition, the UE receives a downlink control information (DCI) associated with the data transmission (step 1401). The data transmission includes one codeword (CW) when L is less than or equal to a threshold, or two codewords otherwise. For example, the threshold can be fixed to 4 or, optionally, made configurable. In this case, the DCI includes one modulation and coding scheme (MCS) field when L is less than or equal to 4, or two MCS fields otherwise. Furthermore, modulated symbols in a CW of the transmitted data can first be mapped across layers associated with the CW, then across frequency sub-carriers, then finally across OFDM symbols.

The UE then decodes the DCI to determine the number of layers L, along with other transmission parameters pertinent to the data transmission (step 1402). Having determined L, the UE decodes the data transmission along with the variable-length CRC (for error detection—step 1403). The UE also generates at least one channel quality indicator (CQI) and transmits the CQI via an uplink channel (step 1404). Using the example of fixing the threshold to 4, the UE generates and transmits one CQI when L is less than or equal to 4, or two CQIs otherwise.

Figure 15:
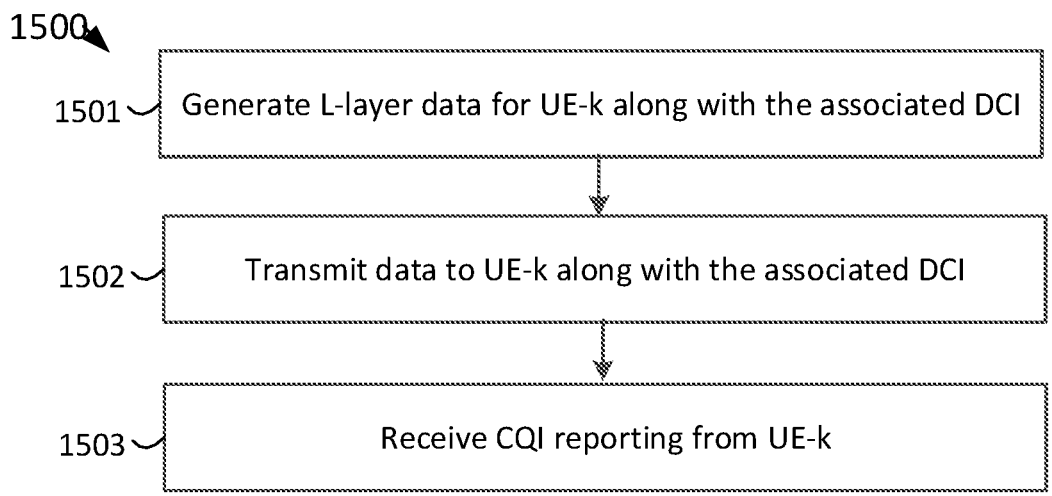
FIG. 15 illustrates a flowchart for an example method wherein a BS generates and transmits multi-layer data for a UE (labeled as UE-k) according to an embodiment of the present disclosure.

FIG. 15 illustrates a flowchart for an example method 1500 wherein a BS generates and transmits multi-layer data for a UE (labeled as UE-k) according to an embodiment of the present disclosure. For example, the method 1500 can be performed by the BS 102.

The method 1500 begins with the BS generating an L-layer data transmission, wherein the data transmission is composed of at least one codeblock (CB) and the CB includes a length-N cyclic redundancy code (CRC). The length of the CRC N is a function of the length of the CB and the length corresponds to a number of bits. In addition, the BS generates a downlink control information (DCI) associated with the data transmission (step 1501). The data transmission includes one codeword (CW) when L is less than or equal to a threshold, or two codewords otherwise. For example, the threshold can be fixed to 4 or, optionally, made configurable. In this case, the DCI includes one modulation and coding scheme (MCS) field when L is less than or equal to 4, or two MCS fields otherwise. Furthermore, modulated symbols in a CW of the transmitted data can first be mapped across layers associated with the CW, then across frequency sub-carriers, then finally across OFDM symbols.

The BS then transmits the L-layer data along with the DCI (step 1502). The BS also receives at least one channel quality indicator (CQI) and transmits the CQI via an uplink channel (step 1503). Using the example of fixing the threshold to 4, the UE generates and transmits one CQI when L is less than or equal to 4, or two CQIs otherwise.

Although FIGS. 14 and 15 illustrate examples of methods for receiving configuration information and configuring a UE, respectively, various changes could be made to FIGS. 14 and 15. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE), comprising:
   a transceiver configured to
   receive, from a base station, downlink control information (DCI) associated with downlink data, the DCI indicating a number of layers and including:
   one modulation and coding scheme (MCS) field, one new data indicator (NDI) field, and one redundancy version (RV) field when a number of codewords that are schedulable by the DCI is one, and two MCS fields, two NDI fields, and two RV fields when the number of codewords that are schedulable by the DCI is two, and
   receive, from the base station in the number of codewords determined based on the indicated number of layers, the downlink data through the number of layers, wherein the number of codewords is one when the number of layers is four or less and the number of codewords is two when the number of layers is greater than four; and
   a processor operably coupled to the transceiver, the processor configured to decode the DCI,
   wherein the downlink data includes one or more codeblocks (CBs), and
   wherein, in case that a number of the one or more CBs is greater than one, the downlink data includes a cyclic redundancy code (CRC) for each of the one or more CBs.

2. The UE of claim 1,
   wherein, in case that the number of the layers is greater than four, the number of codewords include a first codeword comprising a first set of modulation symbols and a second codeword comprising a second set of modulation symbols,
   wherein the first set of modulation symbols is mapped onto a first subset of the layers, and
   wherein the second set of modulation symbols is mapped onto a second subset of the layers.

3. The UE of claim 2, wherein the first subset includes a first layer having a lowest index among the layers,
   wherein the second subset includes a second layer having a highest index among the layers, and
   wherein a number of one or more layers included in the first subset is equal to or less than a number of one or more layers included in the second subset.

4. The UE of claim 1,
   wherein, if the downlink data includes one codeword, one or more modulation symbols of the one codeword are mapped onto the layers according to:

$$x^{(l)}(i)=d(Li+l),\ i=0,1,\ldots,M_{symb}^{layer}-1, l=0,1,\ldots,L-1$$

$$M_{symb}^{layer}=M_{symb}^{CW}/L$$

where $x^{(l)}(i)$ denotes an $i^{th}$ symbol mapped onto an $l^{th}$ layer, $d(k)$ denotes a $k^{th}$ symbol of the one codeword, $M_{symb}^{layer}$ denotes a number of symbols per layer, L denotes a number of layers, and $M_{symb}^{CW}$ denotes a number of symbols in the one codeword, wherein, if the downlink data includes two codewords, one or more modulation symbols of a first codeword of the two codewords and one or more modulation symbols of a second codeword of the two codewords are mapped onto the layers according to:

$$x^{(l)}(i)=d^{(0)}(\lfloor L/2 \rfloor i+l),\ l=0,1,\ldots,\lfloor L/2 \rfloor-1,\ i=0,1,\ldots,M_{symb}^{layer}-1,$$

$$x^{(l+\lfloor L/2 \rfloor)}(i)=d^{(1)}((L-\lfloor L/2 \rfloor)i+l),\ l=0,1,\ldots,L-\lfloor L/2 \rfloor-1, i=0,1,\ldots,M_{symb}^{layer}-1,$$

$$M_{symb}^{layer}=\frac{M_{symb}^{CW0}}{\lfloor L/2 \rfloor}=\frac{M_{symb}^{CW1}}{L-\lfloor L/2 \rfloor}$$

wherein $x^{(l)}(i)$ denotes an $i^{th}$ symbol mapped onto an $l^{th}$ layer, $d^{(n)}(k)$ denotes a $k^{th}$ symbol of an $n^{th}$ codeword which is either the first codeword of the two codewords or the second codeword of the two codewords, $M_{symb}^{layer}$ denotes a number of symbols per layer, L denotes a number of layers, $M_{symb}^{CW0}$ denotes a number of symbols in the first codeword of the two codewords, and $M_{symb}^{CW1}$ denotes a number of symbols in the second codeword of the two codewords.

5. The UE of claim 1, wherein the transceiver is further configured to:
   receive, from the base station, information regarding a maximum number of codewords via radio resource control (RRC) signaling.

6. The UE of claim 1, wherein the transceiver is further configured to:
   transmit, to the base station, channel state information (CSI),
   wherein the CSI includes a channel quality indicator (CQI) per a codeword.

7. A method performed by a user equipment (UE) in a wireless communication system, the method comprising:
   receiving, from a base station, downlink control information (DCI) associated with downlink data, the DCI indicating a number of layers and including:
   one modulation and coding scheme (MCS) field, one new data indicator (NDI) field, and one redundancy version (RV) field when a number of codewords that are schedulable by the DCI is one, and two MCS fields, two NDI fields, and two RV fields when the number of codewords that are schedulable by the DCI is two; and receiving, from the base station in the number of codewords determined based on the indicated number of layers, the downlink data through the number of layers, wherein the number of codewords is one when the number of layers is four or less and the number of codewords is two when the number of layers is greater than four, wherein the downlink data includes one or more codeblocks (CBs), and wherein, in case that a number of the one or more CBs is greater than one, the downlink data includes a cyclic redundancy code (CRC) for each of the one or more CBs.

8. The method of claim 7, wherein, in case that the number of the layers is greater than four, the number of codewords include a first codeword comprising a first set of modulation symbols and a second codeword comprising a second set of modulation symbols, wherein the first set of modulation symbols is mapped onto a first subset of the layers, and wherein the second set of modulation symbols is mapped onto a second subset of the layers.

9. The method of claim 8, wherein the first subset includes a first layer having a lowest index among the layers, wherein the second subset includes a second layer having a highest index among the layers, and wherein a number of one or more layers included in the first subset is equal to or less than a number of one or more layers included in the second subset.

10. The method of claim 7, wherein, if the downlink data includes one codeword, one or more modulation symbols of the one codeword are mapped onto the layers according to:

$$x^{(l)}(i)=d(Li+l), i=0,1,\ldots,M_{symb}^{layer}-1, l=0,1,\ldots,L-1$$

$$M_{symb}^{layer}=M_{symb}^{CW}/L$$

where $x^{(l)}(i)$ denotes an $i^{th}$ symbol mapped onto an $l^{th}$ layer, $d(k)$ denotes a $k^{th}$ symbol of the one codeword, $M_{symb}^{layer}$ denotes a number of symbols per layer, L denotes a number of layers, and $M_{symb}^{CW}$ denotes a number of symbols in the one codeword, wherein, if the downlink data includes two codewords, one or more modulation symbols of a first codeword of the two codewords and one or more modulation symbols of a second codeword of the two codewords are mapped onto the layers according to:

$$x^{(l)}(i)=d^{(0)}(\lfloor L/2 \rfloor i+l), l=0,1,\ldots,\lfloor L/2 \rfloor-1, i=0,1,\ldots,M_{symb}^{layer}-1,$$

$$x^{(l+\lfloor L/2 \rfloor)}(i)=d^{(1)}((L-\lfloor L/2 \rfloor)i+l), l=0,1,\ldots,L-\lfloor L/2 \rfloor-1, i=0,1,\ldots,M_{symb}^{layer}-1,$$

$$M_{symb}^{layer} = \frac{M_{symb}^{CW0}}{\lfloor L/2 \rfloor} = \frac{M_{symb}^{CW1}}{L-\lfloor L/2 \rfloor}$$

where $x^{(l)}(i)$ denotes an $i^{th}$ symbol mapped onto an $l^{th}$ layer, $d^{(n)}(k)$ denotes a $k^{th}$ symbol of an $n^{th}$ codeword which is either the first codeword of the two codewords or the second codeword of the two codewords, $M_{symb}^{layer}$ denotes a number of symbols per layer, L denotes the number of layers, $M_{symb}^{CW0}$ denotes a number of symbols in the first codeword of the two codewords, and $M_{symb}^{CW1}$ denotes a number of symbols in the second codeword of the two codewords.

11. The method of claim 7, further comprising:

receiving, from the base station, information regarding a maximum number of codewords via radio resource control (RRC) signaling.

12. The method of claim 7, further comprising:

transmitting, to the base station, channel state information (CSI), wherein the CSI includes a channel quality indicator (CQI) per a codeword.

13. A base station (BS), comprising:

a transceiver configured to transmit, to a user equipment (UE), downlink control information (DCI) associated with downlink data, the DCI indicating a number of layers and including:

one modulation and coding scheme (MCS) field, one new data indicator (NDI) field, and one redundancy version (RV) field when a number of codewords that are schedulable by the DCI is one, and two MCS fields, two NDI fields, and two RV fields when the number of codewords that are schedulable by the DCI is two, and transmit, to the UE in the number of codewords determined based on the indicated number of layers, the downlink data through the number of layers, wherein the number of codewords is one when the number of layers is four or less and the number of codewords is two when the number of layers is greater than four; and a processor operably coupled to the transceiver, the processor configured to encode the DCI, wherein the downlink data includes one or more codeblocks (CBs), and wherein, in case that a number of the one or more CBs is greater than one, the downlink data includes a cyclic redundancy code (CRC) for each of the one or more CBs.

14. The BS of claim 13, wherein, in case that the number of the layers is greater than four, the number of codewords include a first codeword comprising a first set of modulation symbols and a second codeword comprising a second set of modulation symbols, wherein the first set of modulation symbols is mapped onto a first subset of the layers, and wherein the second set of modulation symbols is mapped onto a second subset of the layers.

15. The BS of claim 14, wherein the first subset includes a first layer having a lowest index among the layers, wherein the second subset includes a second layer having a highest index among the layers, and wherein a number of one or more layers included in the first subset is equal to or less than a number of one or more layers included in the second subset.

16. The BS of claim 13, wherein, if the downlink data includes one codeword, one or more modulation symbols of the one codeword are mapped onto the layers according to:

$$x^{(l)}(i)=d(Li+l), i=0,1,\ldots,M_{symb}^{layer}-1, l=0,1,\ldots,L-1$$

$$M_{symb}^{layer}=M_{symb}^{CW}/L$$

where $x^{(l)}(i)$ denotes an $i^{th}$ symbol mapped onto an $l^{th}$ layer, $d(k)$ denotes a $k^{th}$ symbol of the one codeword, $M_{symb}^{layer}$ denotes a number of symbols per layer, L denotes a number of layers, and $M_{symb}^{CW}$ denotes a number of symbols in the one codeword, wherein, if the downlink data includes two codewords, one or more modulation symbols of a first codeword of the two codewords and one or more modulation symbols of a second codeword of the two codewords are mapped onto the layers according to:

$$x^{(l)}(i)=d^{(0)}(\lfloor L/2 \rfloor i+l),\ l=0,1,\ \ldots\ ,\lfloor L/2 \rfloor-1,\ i=0,1,\ldots,M_{symb}^{layer}-1,$$

$$x^{(l+\lfloor L/2 \rfloor)}(i)=d^{(1)}((L-\lfloor L/2 \rfloor)i+l),\ l=0,1,\ \ldots\ ,L-\lfloor L/2 \rfloor-1,\ i=0,1,\ldots,M_{symb}^{layer}-1,$$

$$M_{symb}^{layer}=\frac{M_{symb}^{CW0}}{\lfloor L/2 \rfloor}=\frac{M_{symb}^{CW1}}{L-\lfloor L/2 \rfloor}$$

wherein $x^{(l)}(i)$ denotes an $i^{th}$ symbol mapped onto an $l^{th}$ layer, $d^{(0)}(k)$ denotes a $k^{th}$ symbol of an $n^{th}$ codeword which is either the first codeword of the two codewords or the second codeword of the two codewords, $M_{symb}^{layer}$ denotes a number of symbols per layer, L denotes a number of layers, $M_{symb}^{CW0}$ denotes a number of symbols in the first codeword of the two codewords, and $M_{symb}^{CW1}$ denotes a number of symbols in the second codeword of the two codewords.

17. The BS of claim 13, wherein the transceiver is further configured to:
   transmit, to the UE, information regarding a maximum number of codewords via radio resource control (RRC) signaling.

18. The BS of claim 13, wherein the transceiver is further configured to:
   receive, from the UE, channel state information (CSI), wherein the CSI includes a channel quality indicator (CQI) per a codeword.

19. The method of claim 7, wherein the number of the layers is indicated by the DCI.

20. The UE of claim 1, wherein the number of the layers is indicated by the DCI.

21. The BS of claim 13, wherein the number of the layers is indicated by the DCI.

\* \* \* \* \*